(12) United States Patent
Cisler et al.

(10) Patent No.: US 9,294,359 B2
(45) Date of Patent: *Mar. 22, 2016

(54) SYSTEM CONNECTIONS AND USER INTERFACES

(71) Applicant: Apple Inc., Cupertino, CA (US)

(72) Inventors: Pavel Cisler, Los Gatos, CA (US); Yan Arrouye, Mountain View, CA (US); John Iarocci, Los Gatos, CA (US); Marc Jason Krochmal, Santa Clara, CA (US); Christopher Brooke Sharp, San Jose, CA (US); Christopher Scott Linn, Palo Alto, CA (US); Mikhail Gonodanov, San Jose, CA (US); Simon P. Cooper, Cupertino, CA (US); Richard Murphy, Boulder Creek, CA (US)

(73) Assignee: Apple Inc., Cupertino, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 13/645,415

(22) Filed: Oct. 4, 2012

(65) Prior Publication Data

US 2013/0145275 A1 Jun. 6, 2013

Related U.S. Application Data

(63) Continuation of application No. 11/760,754, filed on Jun. 9, 2007, now Pat. No. 8,296,833.

(51) Int. Cl.
*H04L 29/06* (2006.01)
*H04L 12/24* (2006.01)
(Continued)

(52) U.S. Cl.
CPC .......... *H04L 41/22* (2013.01); *G06F 17/30126* (2013.01); *G06F 17/30197* (2013.01); *G06F 21/33* (2013.01)

(58) Field of Classification Search
CPC ... H04L 41/22; G06F 21/33; G06F 17/30197; G06F 17/30126
USPC ...................................................... 726/1–5, 8
See application file for complete search history.

(56) References Cited

U.S. PATENT DOCUMENTS 7,137,006 B1 11/2006 Grandcolas et al.
7,210,167 B2 4/2007 Brezak et al.
(Continued)

FOREIGN PATENT DOCUMENTS

WO 2006/004670 A2 1/2006

OTHER PUBLICATIONS

What is Screen Sharing? http://www.kolabora.com/news/2006/10/05/screen_sharing_tools_and_technology.htm, retrieved from the wayback machined archived Oct. 13, 2006.
(Continued)

*Primary Examiner* — Yin-Chen Shaw
*Assistant Examiner* — John B King
(74) *Attorney, Agent, or Firm* — Downey Brand LLP

(57) ABSTRACT

This disclosure relates to methods and systems to allow, in one embodiment, automatic access from one system to other systems which include an operating system that includes a user login process. In one embodiment, a method includes logging into, automatically in response to starting a first data processing system, a second data processing system at least as a guest user of the second data processing system which has a storage volume storing data and displaying a user interface object on a display device of the first data processing system, the user interface object corresponding to at least one of the second data processing system and the storage volume to allow at least one of a search to be performed or a browsing to be performed of the data stored on the storage volume.

14 Claims, 20 Drawing Sheets

(51) Int. Cl.
*G06F 17/30* (2006.01)
*G06F 21/33* (2013.01)

(56) References Cited

U.S. PATENT DOCUMENTS

| | | | |
|---|---|---|---|
| 7,249,168 B1 * | 7/2007 | Ryder | 709/220 |
| 2003/0105812 A1 | 6/2003 | Flowers, Jr. et al. | |
| 2003/0191964 A1 * | 10/2003 | Satyavolu et al. | 713/201 |
| 2004/0184478 A1 | 9/2004 | Donescu et al. | |
| 2005/0149508 A1 | 7/2005 | Deshpande | |
| 2006/0039356 A1 | 2/2006 | Rao et al. | |
| 2006/0098588 A1 | 5/2006 | Zhang et al. | |
| 2006/0136828 A1 | 6/2006 | Asano | |
| 2007/0016655 A1 | 1/2007 | Goodman et al. | |
| 2007/0180449 A1 | 8/2007 | Croft et al. | |
| 2007/0282757 A1 | 12/2007 | Pandya et al. | |

OTHER PUBLICATIONS

Microsoft Outlook 2000; "Step by Step", Copyright 1999, pp. 72-75 and 255-258.
Bott, et al., "Microsoft® Windows® XP Inside Out, Second Edition" © 2004 Microsoft Press, Excerpts from Chapters 25 and 26 (58 pages).
The Microsoft Press, "Microsoft® Windows® XP Professional Resource Kit, Second Edition" © 2003 Microsoft Press (pp. 655-697).
J. Kohl, et al., "RFC 1510: The Kerberos Network Authentication Service (V5)" © 1993 Network Working Group (112 pages) http://ietfreport.isoc.org/rfc/PDF/rfc1510.pdf.
Apple Remote Desktop Administrator's Guide Version 2.2 dated Mar. 4, 2005 (119 pages).
Bradley Mitchell, "How to Find Shared Windows Folders," compnetworking.about.com retrieved by archive.org dated Sep. 30, 2004. (2 pages).
Robin Good, "Kolabora Latest News: What is Screen Sharings" www.kolabora.com, retrieved by archive.org dated Oct. 13, 2006 (32 pages).
Microsoft TechNet "File and Printer Sharing in Windows Vista", published Nov. 8, 2006, updated May 14, 2007 (14 pages).
Apple Remote Desktop Administrator's Guide, Version 2.2 dated Mar. 4, 2005 (pp. 1, 2 and 52).
Hosted Desktop Manual by eXpert Networks Inc., dated Aug. 18, 2005 (20 pages).
Jason Garman, "Kerberos: The Definitive Guide" © 2003 O'Reilly Media Inc., Excerpt from Chapter 6 (12 pages).
Christopher Hertel, "Implementing CIFS: The Common Internet FileSystem" Excerpt from Chapter 3: The Browse Service. © 2002, 2003 Christopher Hertel. (34 Pages) Available at http://ubiqx.org/cifs/Browsing.html.
Wikipedia article for "File Sharing" published Jun. 7, 2007 (10 pages) http://en.wikipedia.org/w/indiex.php?title=File_sharing&oldid=136583937&printable=yes.
Lowe, et al., "WinXP Pro File Sharing", Dec. 12, 2001, website http://www.practicallynetworked.com/sharing/wp_filesharing/index.htm and sections 1-9 on subsequent pages (20 pages).
David Pogue, Mac OS X: The Missing Manual, Panther Edition, David Pogue Press LLC, 2005 pp. 19, 70-72, 471-473 (8 pages).

* cited by examiner

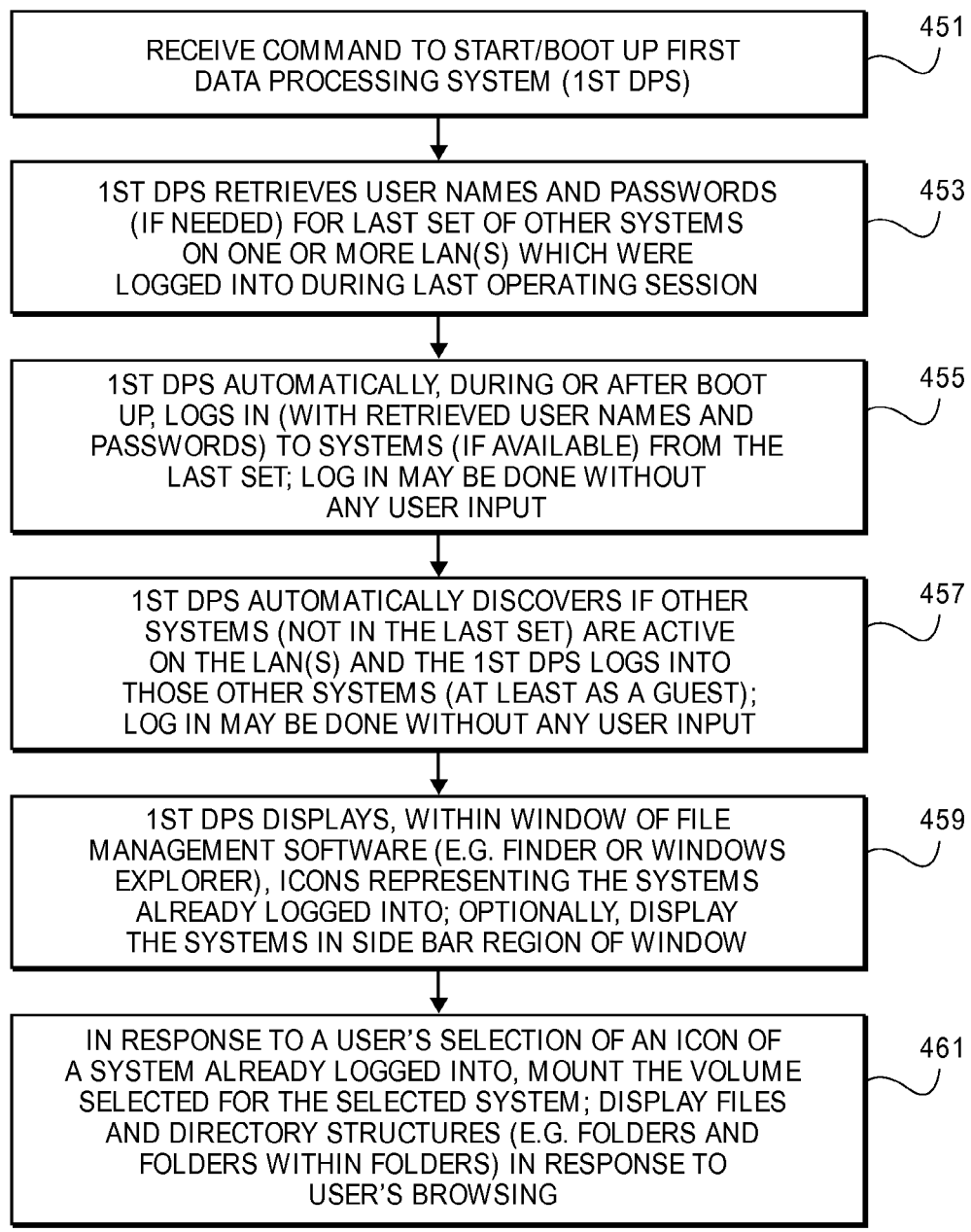

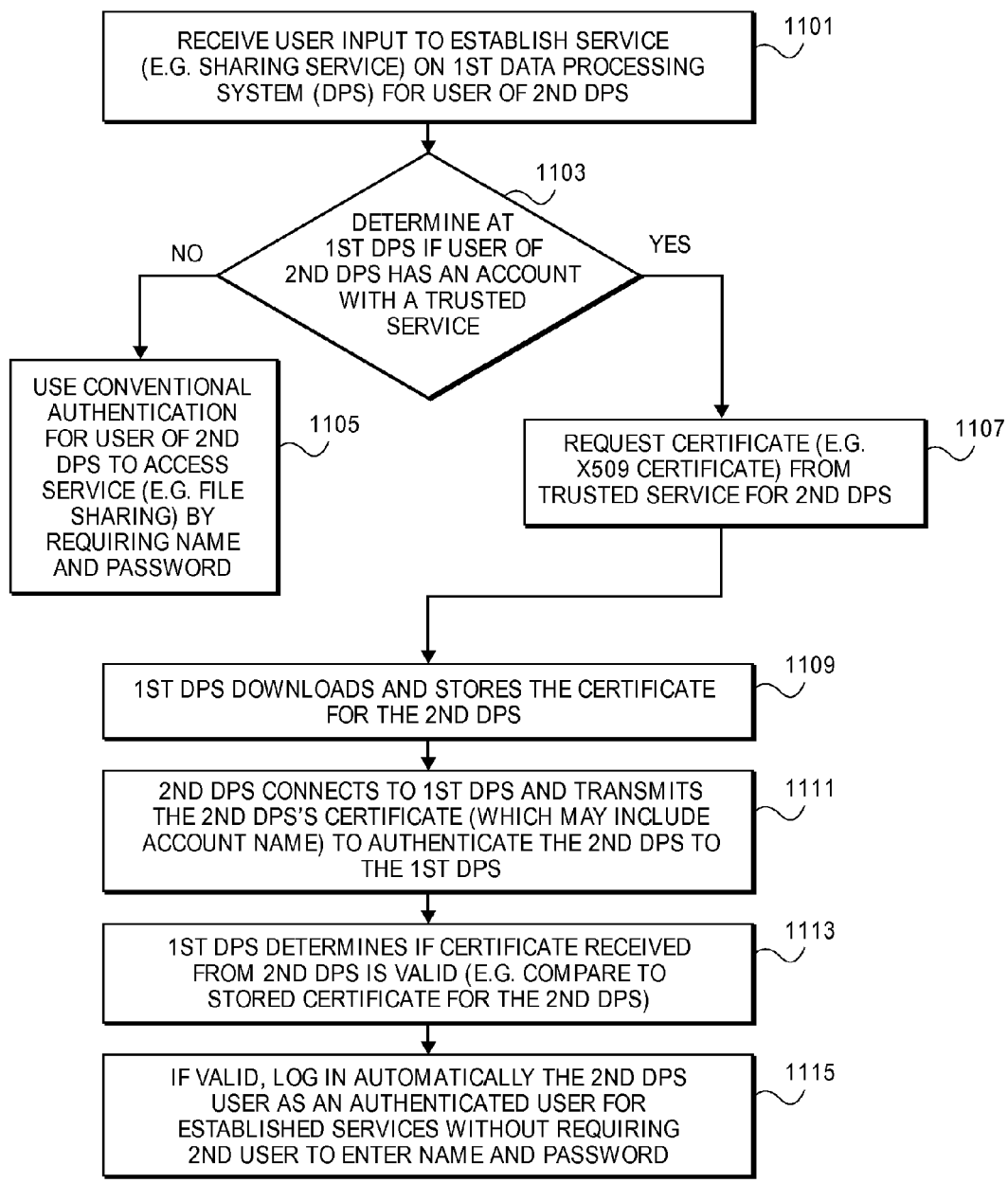

SYSTEM CONNECTIONS AND USER INTERFACES

CROSS REFERENCE TO RELATED APPLICATIONS

This patent application is a continuation of and claims priority under 35 U.S.C. §120 to pending U.S. application Ser. No. 11/760,754, filed Jun. 9, 2007, and entitled "SYSTEM CONNECTIONS AND USER INTERFACES" by Pavel Cisler et al., which is incorporated herein by reference in its entirety and for all purposes.

BACKGROUND OF THE INVENTION

Existing computer systems typically provide ways for a user of the computer system to access other systems, such as servers, on a network which is coupled to the other systems. For example, computer systems which run the Windows operating system or which run the Macintosh OS X operating system, such as OS 10.4, allow a user to gain access to files and folders through a network or through other types of communication media, wherein those files and folders are stored on a storage volume which is part of one or more other systems on the network. In order to gain access to such other systems, a user enters a name and a password, if the password is required, in order to gain access. This provides some security and control for the system which is providing access to its files and data. This security is provided by most modern operating systems which require that a user log into a data processing system as a particular user. A data processing system, such as a computer system, may have more than one user, each of which has a user account which defines the rights and permissions the user has with respect to the system and the files and folders on the system. The types of users include a guest user, named users (typically chosen by a user of the system) and one or more administrator users, which typically have greater permissions and rights with respect to access to and manipulation of files and folders and applications on a data processing system. A user can set up a data processing system to allow file sharing or screen sharing or other forms of sharing so that another user on another system can gain access to data stored, such as files, on the system set up to allow the sharing.

Existing data processing systems which allow such sharing require the user to go through a series of steps before they can gain access to files on another system which has been set up to allow access to those files on the other system. In other words, the user of the system seeking access manually logs into the other system by entering at least a user name and a password, if the password is required. This is true even if the user merely seeks to browse through files and folders on the other system by manually looking through one or more folders on the other system for the various files on the other system.

SUMMARY OF THE DESCRIPTION

This description relates to methods and systems for providing a connection, such as an automatic connection, from a first system to another system. In one embodiment, a method includes logging into, automatically, in response to starting a first data processing system, a second data processing system at least as a guest user of the second data processing system which has a storage volume storing data and displaying a user interface object on a display device of the first data processing system, the user interface object corresponding to at least one of the second data processing system and the storage volume to allow at least one of a search to be performed or a browsing to be performed of the data stored on the storage volume. The second data processing system may have an operating system which includes a user login process, and wherein the user login process is performed on the second data processing system automatically, without requiring a user of the first data processing system to enter data comprising at least one of a user name and a password. The first data processing system and the second data processing system may be coupled through a network, and the logging into automatically may occur even if the second data processing system is a new addition to the network. The first data processing system may store user names and corresponding passwords for a set of systems previously logged into through the network and may use those stored user names and corresponding passwords to log into systems in the set of systems as part of the automatic logging into process. The automatic login process may occur even in the case where the first data processing system is logging into, for the first time, the second data processing system.

The user interface object which corresponds to at least one of the second data processing system and the storage volume may be displayed in a user configurable portion of a file management software window which also includes a file and folder viewing portion; this user configurable portion may be capable, in certain embodiments, of being scrolled. By opening a displayed file shown in the file and folder viewing portion, an application may be launched from within the file management software window. In certain embodiments, the user configurable portion may include a spring-loaded folder which causes a new window to open in response to positioning a selected icon in proximity to the spring-loaded folder. The user configurable portion may include an eject user interface object displayed adjacent to the user interface object corresponding to at least the second data processing system or the storage volume.

In certain embodiments, the method may further include mounting the storage volume and displaying, in response to the mounting, one or more files and folders stored by the storage volume. The mounting may be performed automatically in response to the starting or in response to a user selection of the user interface object.

The starting of the first data processing system may be either a booting up of the first data processing system from a shutdown state or a sleep state or may be a logging in process for a user who was logged off.

Other aspects of the present inventions include various data processing systems which perform these methods and computer readable media which cause a data processing system to perform various methods described herein.

BRIEF DESCRIPTION OF THE DRAWINGS

The present invention is illustrated by way of example and not limitation in the figures of the accompanying drawings in which like references indicate similar elements.

FIG. 4 is a flow chart providing an example of a method according to certain embodiments, including those embodiments shown in FIGS. 3A-3I.

FIG. 11 shows a method which may operate in the context of the system architecture shown in FIG. 10.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a through understanding of various embodiments of the present invention. However, in certain instances, well-known or conventional details are not described in order to provide a concise discussion of embodiments of the present inventions.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Inc., 2007.

Figure 1:
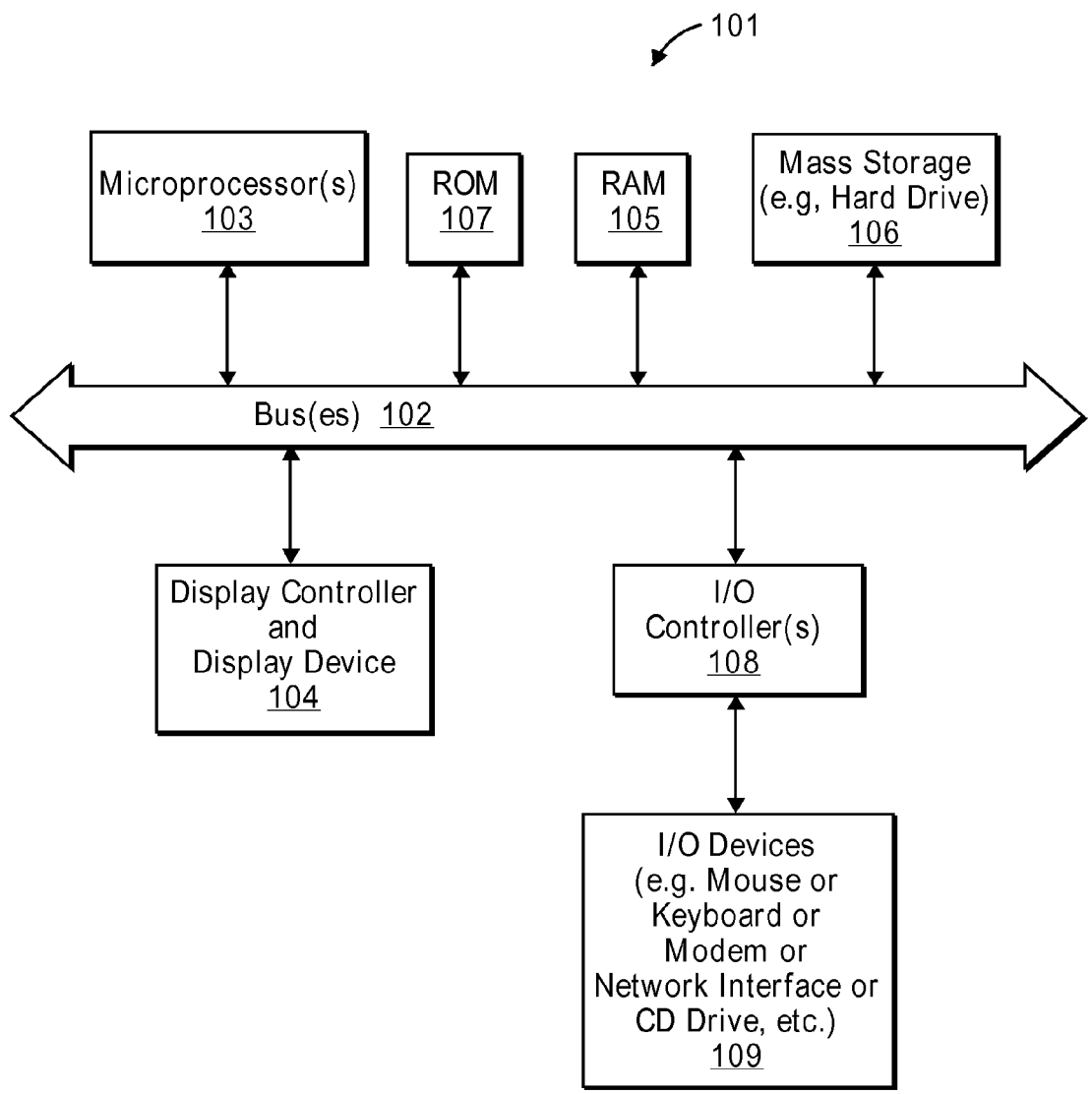
FIG. 1 shows an exemplary embodiment of a data processing system, which may be a general purpose computer system and which may operate in any of the various methods described herein.

FIG. 1 shows one example of a data processing system, such as a computer system, which may be used with the present invention. Note that while FIG. 1 illustrates various components of a data processing system, it is not intended to represent any particular architecture or manner of interconnecting the components as such details are not germane to the present invention. It will also be appreciated that network computers, personal digital assistants (PDAs), cellular telephones, handheld computers, special purpose computers, entertainment systems and other data processing systems and consumer electronic devices which have fewer components or perhaps more components may also be used with the present invention. The system of FIG. 1 may, for example, be a Macintosh computer from Apple Inc.

As shown in FIG. 1, the computer system 101, which is a form of a data processing system, includes a bus 102 which is coupled to a microprocessor(s) 103 and a ROM (Read Only Memory) 107 and volatile RAM 105 and a non-volatile memory 106. The microprocessor 103 may be one or more microprocessors from Intel or IBM, etc. The bus 102 interconnects these various components together and also interconnects these components 103, 107, 105, and 106 to a display controller and display device 104 and to peripheral devices such as input/output (I/O) devices which may be mice, keyboards, modems, network interfaces, printers and other devices which are well known in the art. Typically, the input/output devices 109 are coupled to the system through input/output controllers 108. The volatile RAM (Random Access Memory) 105 is typically implemented as dynamic RAM (DRAM) which requires power continually in order to refresh or maintain the data in the memory. The mass storage 106 is typically a magnetic hard drive or a magnetic optical drive or an optical drive or a DVD RAM or nonvolatile semiconductor memory (e.g. Flash memory) or other types of memory systems which maintain data (e.g. large amounts of data including software) even after power is removed from the system. Typically, the mass storage 106 will also be a random access memory although this is not required. While FIG. 1 shows that the mass storage 106 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless interface such as WiFi or a cellular telephone. The bus 102 may include one or more buses connected to each other through various bridges, controllers and/or adapters as is well known in the art. In one embodiment the I/O controller 108 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, RAM 105, mass storage 106 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description.

However, those skilled in the art will recognize what is meant by such expressions is that the functions result from execution of the code by a processor, such as the microprocessor 103.

Figure 2:
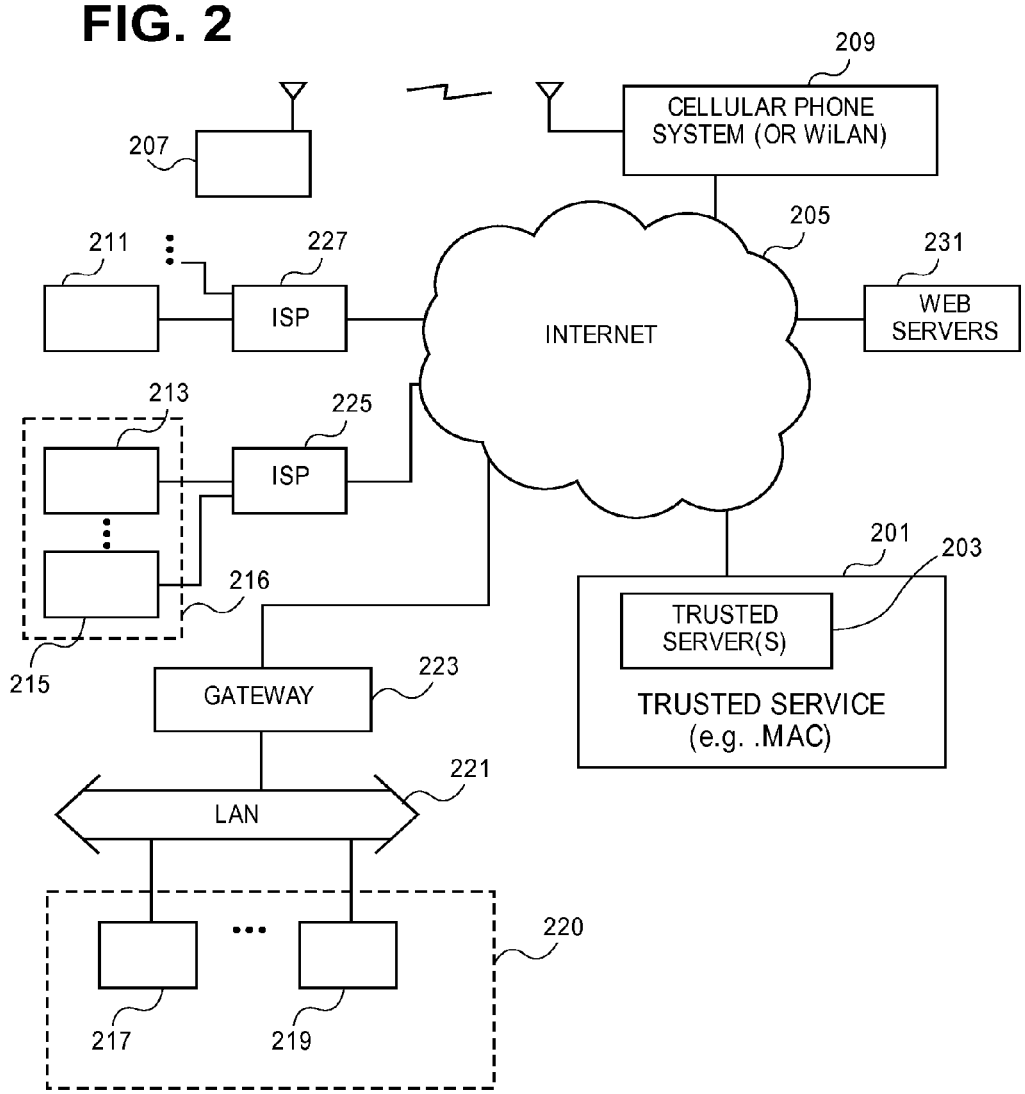
FIG. 2 is an example of a plurality of data processing systems which are coupled to several networks.

FIG. 2 shows a plurality of networks which may be interconnected to allow communication among the various data processing systems in the network or networks. Each of the data processing systems, such as data processing systems 207, 211, 213, 215, 217, and 219 may be coupled to any one of the other data processing systems using known protocols and methods, such as TCP/IP, etc. Each of the data processing systems may be similar to the data processing systems discussed relative to FIG. 1. For example, they may be general purpose computer systems, handheld computers, cellular telephones, PDAs, etc. The data processing system 207 may be a handheld computer which includes wireless interfaces, such as a wireless interface for WiFi or a cellular telephone transceiver. The data processing system 211 may be a laptop or desktop general purpose computer, and the data processing system 213 may be an entertainment system such as a video or other game system. Each of the data processing systems may be coupled to any one of the other data processing systems through a local area network, such as the local area network (LAN) 221 which couples together a plurality of data processing systems, such as the data processing systems 217 and 219 which represent two of many users in a company or other large organization 220 with a large LAN. The data processing systems 213 and 215 may be within a household and may be interconnected in a wireless local area network, such as WiFi. Each of the data processing systems 213 and 215 are coupled to the Internet through an Internet Service Provider (ISP) 225. The data processing system 211 is coupled to the Internet 205 through the ISP 227 which may also provide Internet service to a plurality of other data processing systems. The data processing systems 217 and 219 may be coupled, though the LAN 221 and the gateway system 223 to the Internet 205 as shown in FIG. 2. The data processing system 207 may be coupled to the Internet through a cellular telephone network or through a wireless LAN, such as WiMAX. FIG. 2 shows an example of a cellular telephone system 209 which may include a plurality of cellular telephone towers which are coupled through a mobile switching system to POTS (plain old telephone system) which is also coupled to the Internet 205. One or more web servers 231 are also coupled to the Internet 235 to provide web pages and other services to one or more of the data processing systems shown in FIG. 2. A trusted server 203, which may be similar to the data processing systems discussed relative to FIG. 1, is also coupled to the Internet 205. The trusted server 203 is within or controlled by a trusted service in a domain. Examples of such trusted services include the ".mac" service from Apple Inc. of Cupertino, Calif., and services provided by Google of Mountain View, Calif., or Yahoo, or MSN from Microsoft of Redmond, Wash. The trusted service may be provided within a domain such as "apple.com" or "mac.com" or "msn.com" or "google.com" or "yahoo.com." The service may include the provision of an email server or servers for email service, storage services, backup services, synchronization services, data services, etc. One or more of the data processing systems shown in FIG. 2 may utilize these services by setting up an account with one or more services; the account may require the payment of consideration or it may not. The trusted server or servers 203 may also provide services in connection with authentication of users for the purpose of sharing (e.g. as in the example shown in FIG. 11), wherein the users have different user accounts with the service, or provide for automatic login for the same account on two different data processing systems as in, for example, the method shown in FIG. 8 or FIG. 9.

The plurality of networks shown in FIG. 2 allows for sharing services to be provided between the various data processing systems through communications through the plurality of networks. For example, the user of data processing system 219 may set up that data processing system to allow sharing of files stored in that data processing system 219 by the user of the data processing system 217. Similarly, the user of the data processing system 215 may set up that data processing system to allow its files to be shared and used by the user of the data processing system 213. Various methods for providing sharing services are described further below.

Figure 3A:
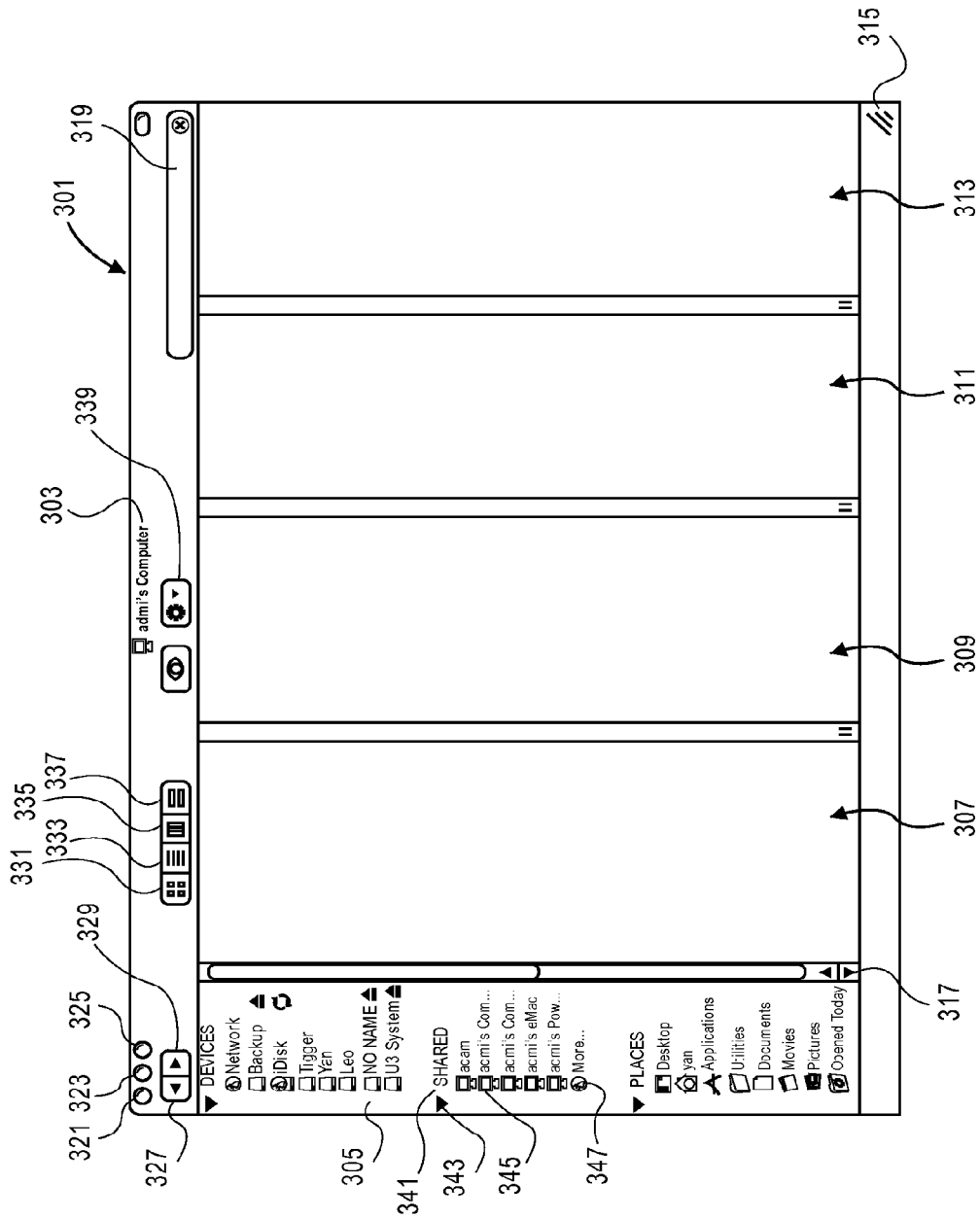
FIG. 3A shows an example of a user interface for a file management software window.

FIG. 3A shows an example of a user interface for a file management software window 301 which in this case is provided by the file management software known as the Finder from Apple Inc. of Cupertino, Calif. The file management software window 301 includes many features which allow the window to be moveable, resizeable, closeable, minimizable, and maximizable, and to provide various different views of the files and folders stored on one or more storage volumes. Further, the window and associated user interface features allow files and folders to be copied and moved and deleted, etc. The window 301 may be one of many windows displayed on a display device; the windows may be overlapping or tiled and may be displayed on top of a desktop. For example, multiple windows displayed by the Finder may be concurrently displayed on the same display device and be displayed in an overlapping manner such that one window overlaps and covers up another window, etc. Other examples of file management software windows are the windows provided by the Windows Explorer software program from Microsoft. The window 301 includes a window title bar 303, a resize user interface object 315 which may be used to resize the window 301 using known techniques. The window title bar 303 may be used to move the window using known techniques in the art. The window 301 also includes a user configurable portion 305 which is scrollable through the use of one or more scroll control user interface objects 317, such as a scroll bar or up and down arrows as shown in FIG. 3A. The user configurable portion 305 includes a plurality of local storage devices on the actual data processing system which is providing the file management software window and also includes folders and other objects placed into the user configurable portion by the user, such as the user interface objects below the "places" heading in the user configurable portion 305. Certain local storage volumes (e.g. those volumes directly coupled to the system displaying window 301) are shown under the heading "devices" in the user configurable portion 305. Also, shared volumes or shared data processing systems which are provided through, for example, a network connection, are shown under the "shared" heading 341 in the user configurable portion 305. Each of the shared volumes or systems is associated with a different data processing system having user accounts which are different than the user account on the system generating and displaying the window 301. Each of the headings is collapsible by selecting or toggling a collapse user interface object, such as the collapse user interface object 343. The system icon 345 is an example of a data processing system which is sharing, for example, its files, with a data processing system which generates and displays the window 301.

The window 301 also includes a plurality of other user interface objects to control the display or other presentation of the window. For example, a "close" user interface object 321 allows the window to be closed in response to selecting that user interface object. The "minimize" user interface object 323 allows the window to be minimized as is known in the art. In certain embodiments, the minimized window is displayed in miniature form in a dock or task bar in certain systems. The "maximize" user interface object 325 allows the window to be enlarged to its maximum size when it is selected. A "back" user interface object 327 and a "forward" user interface object 329 allow a user to move back and forward through a history, similar to a history list in a web browser, of the display of the various files and folders viewable through the file management software window. The files and folders may be viewed in a plurality of different views, including an icon view, selectable through the "icon view" user interface object 331, a column view which is selectable through the "column view" user interface object 335, a list view, which is selectable through the "list view" user interface object 333, and a cover flow view which is selectable by activating the "cover flow view" user interface object 337. The view shown in FIG. 3A is a column view while the view shown in FIG. 3G is an icon view within the file and folder viewing portion 377, and the view within each column of the column view is a list view. The window 301 may also include a search input field 319 into which a user may enter one or more words or other characters to cause a search to be performed. This search may be performed through one or more metadata databases and one or more full text content inverted index databases, such as the databases described in published PCT Application No. WO 2006/004670, which application is hereby incorporated herein by reference.

Figure 3B:
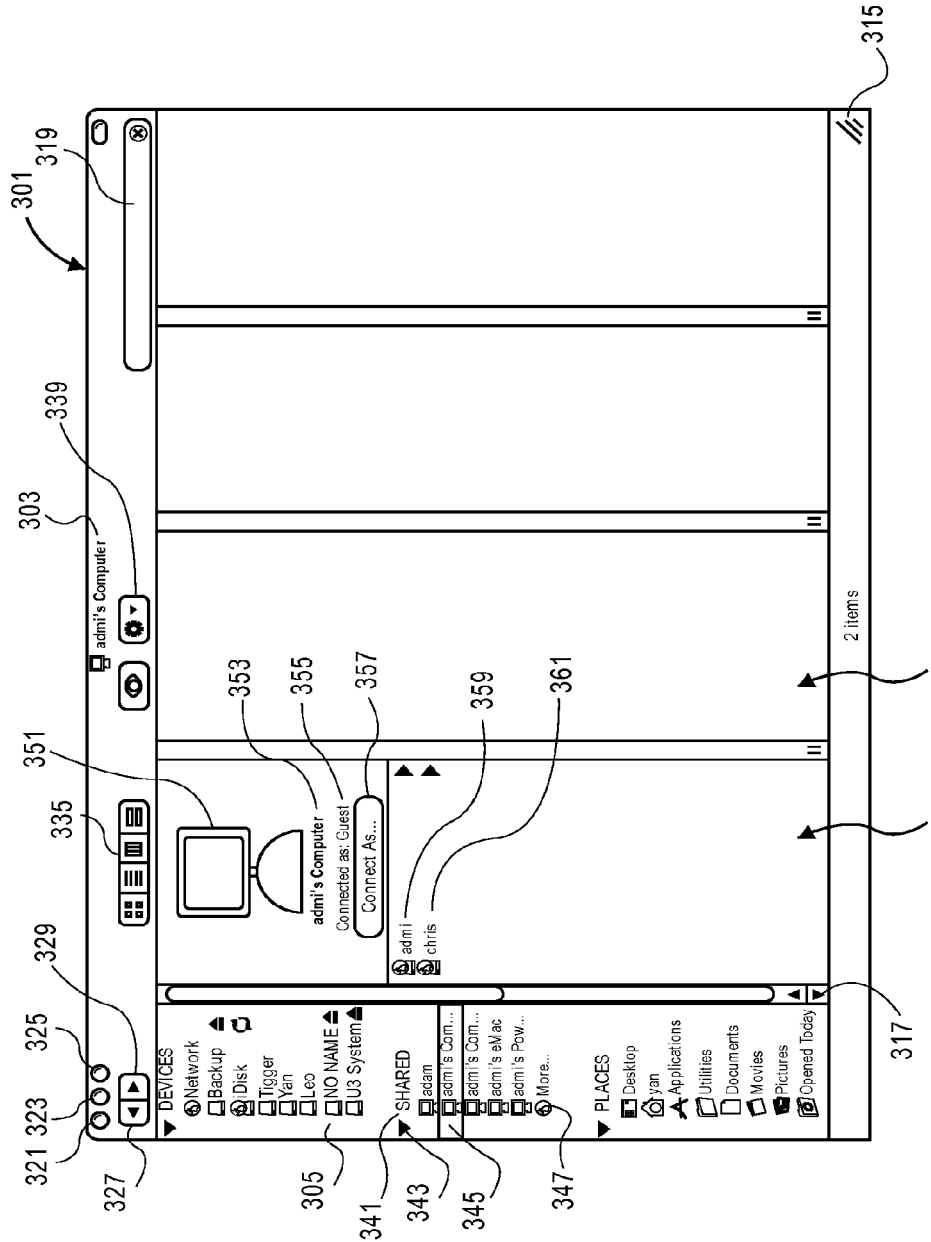
FIG. 3B shows the window of FIG. 3A after an item has been selected in a user configurable portion of the window.
Figure 3C:
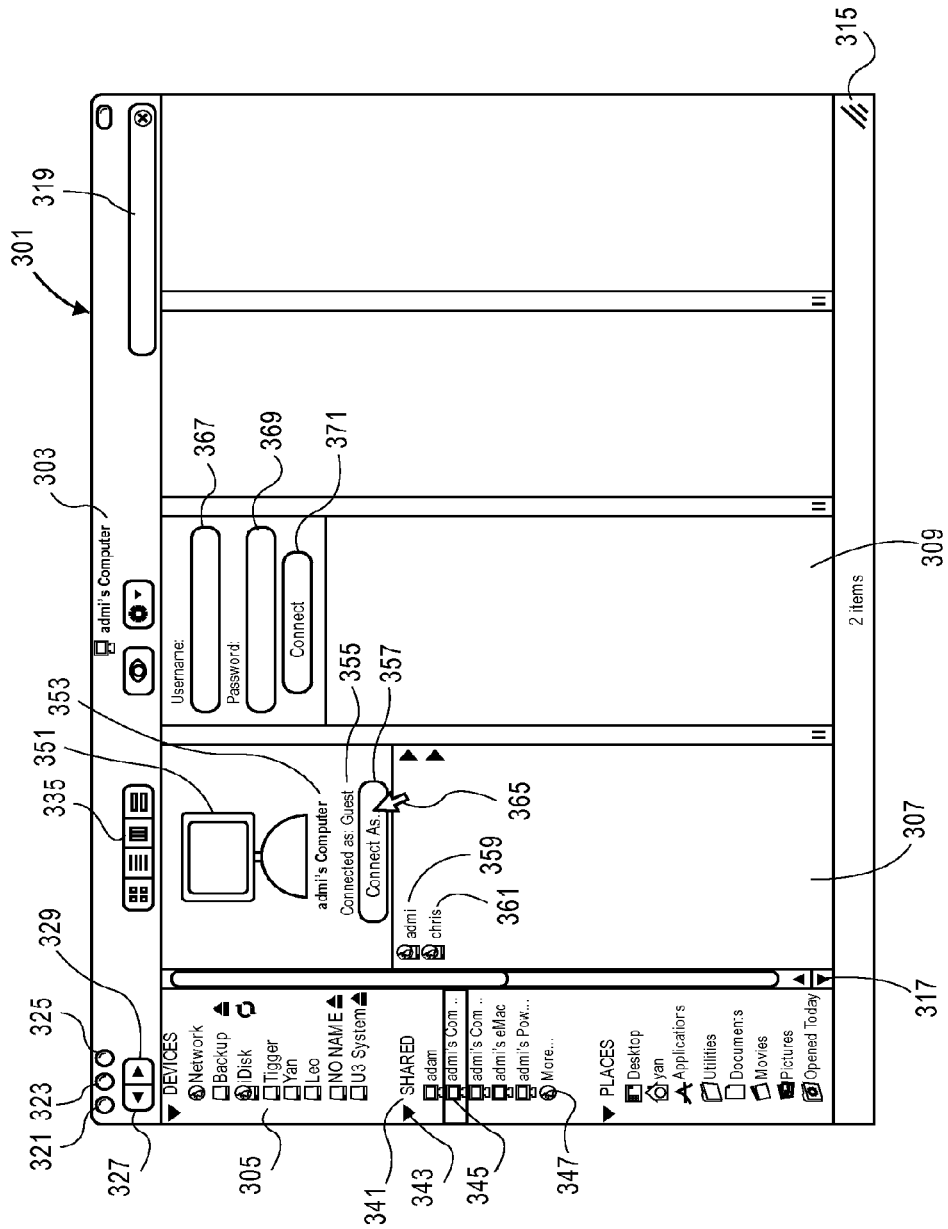
FIG. 3C shows the window of FIG. 3B after the selection of a user interface object in the window of FIG. 3B.
Figure 3D:
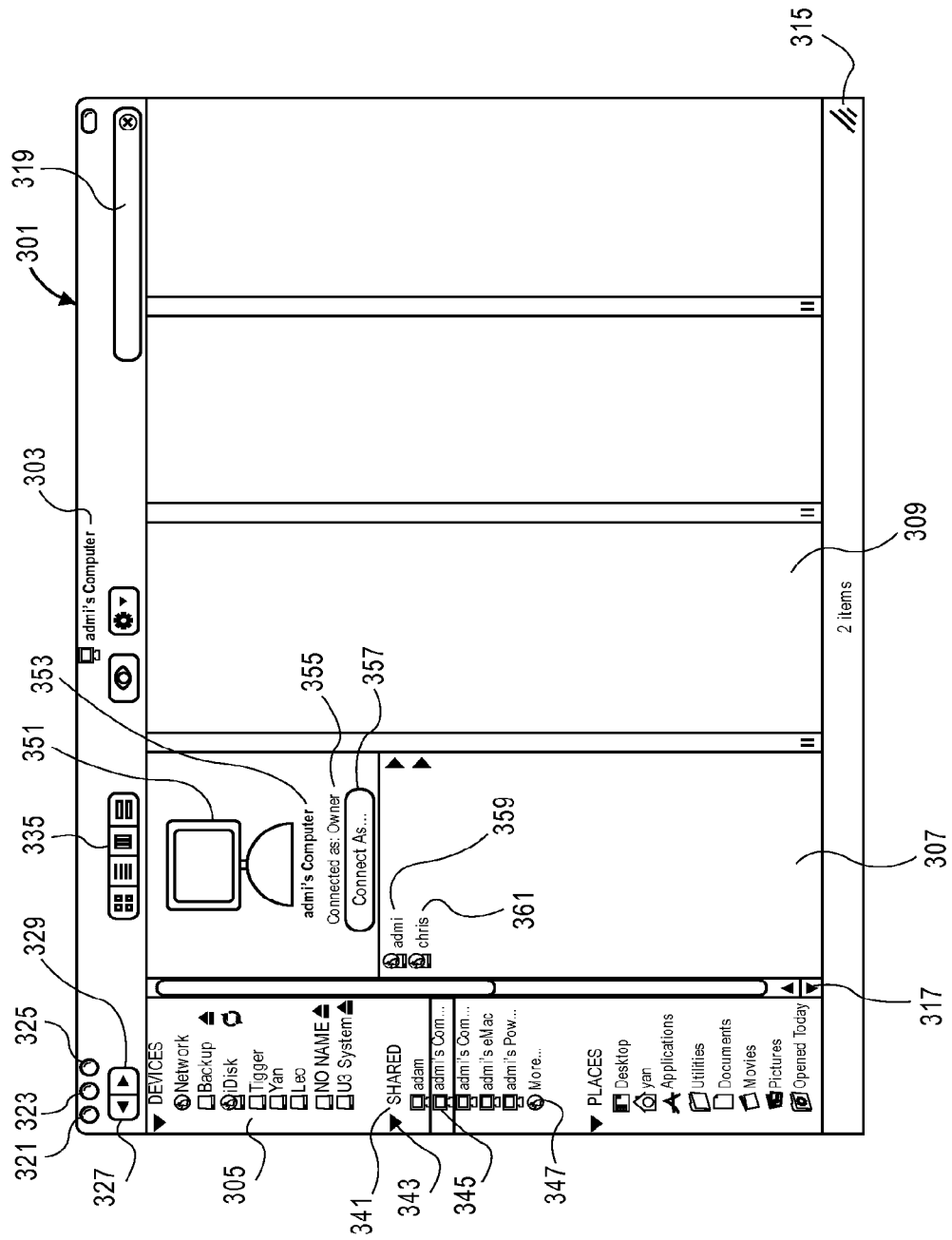
FIG. 3D shows the window of FIG. 3C after an operation has occurred in response to the selection of a user interface object within the window shown in FIG. 3C.
Figure 3E:
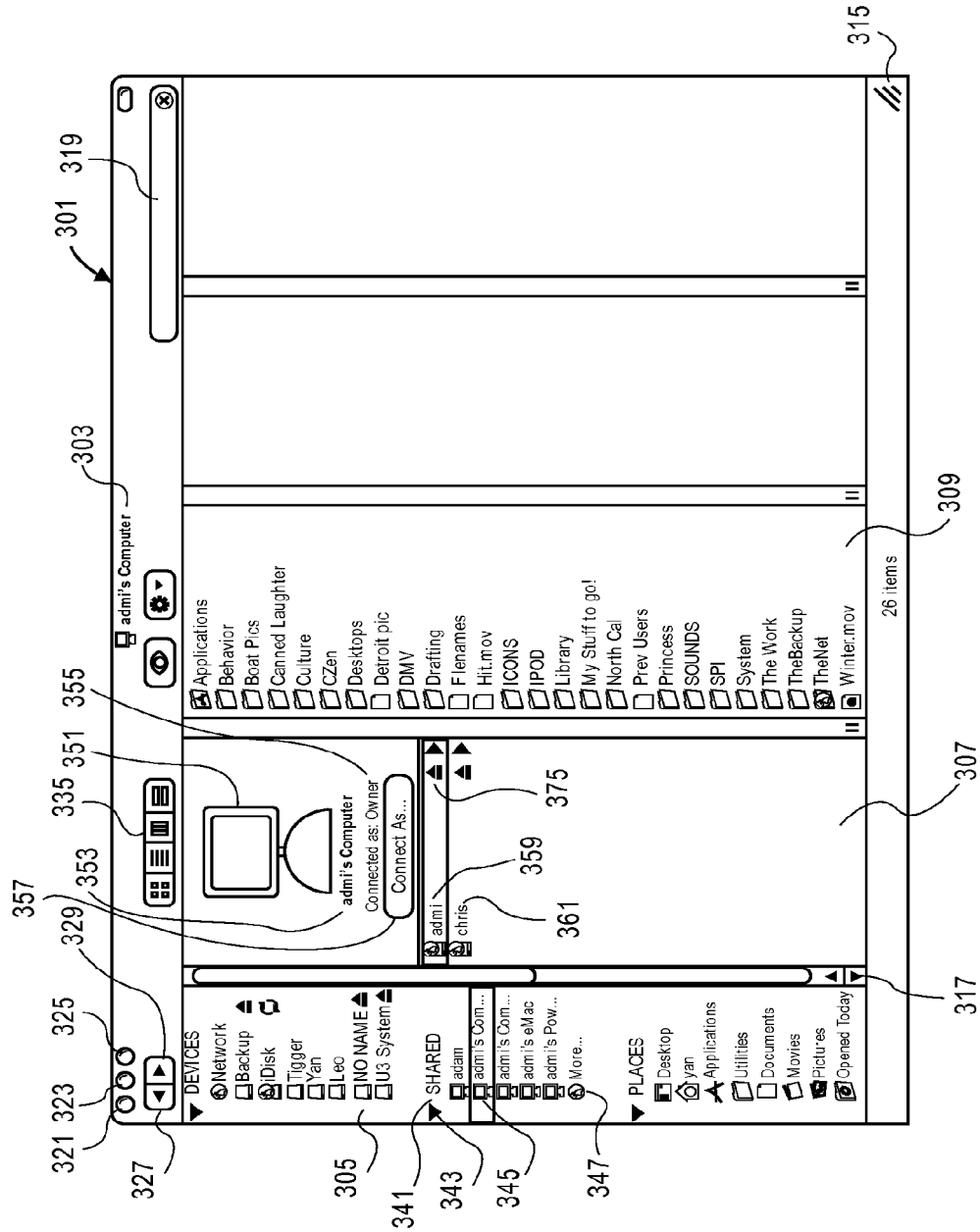
FIG. 3E shows the window of FIG. 3D after the selection of a particular storage volume shown in FIG. 3E.
Figure 3F:
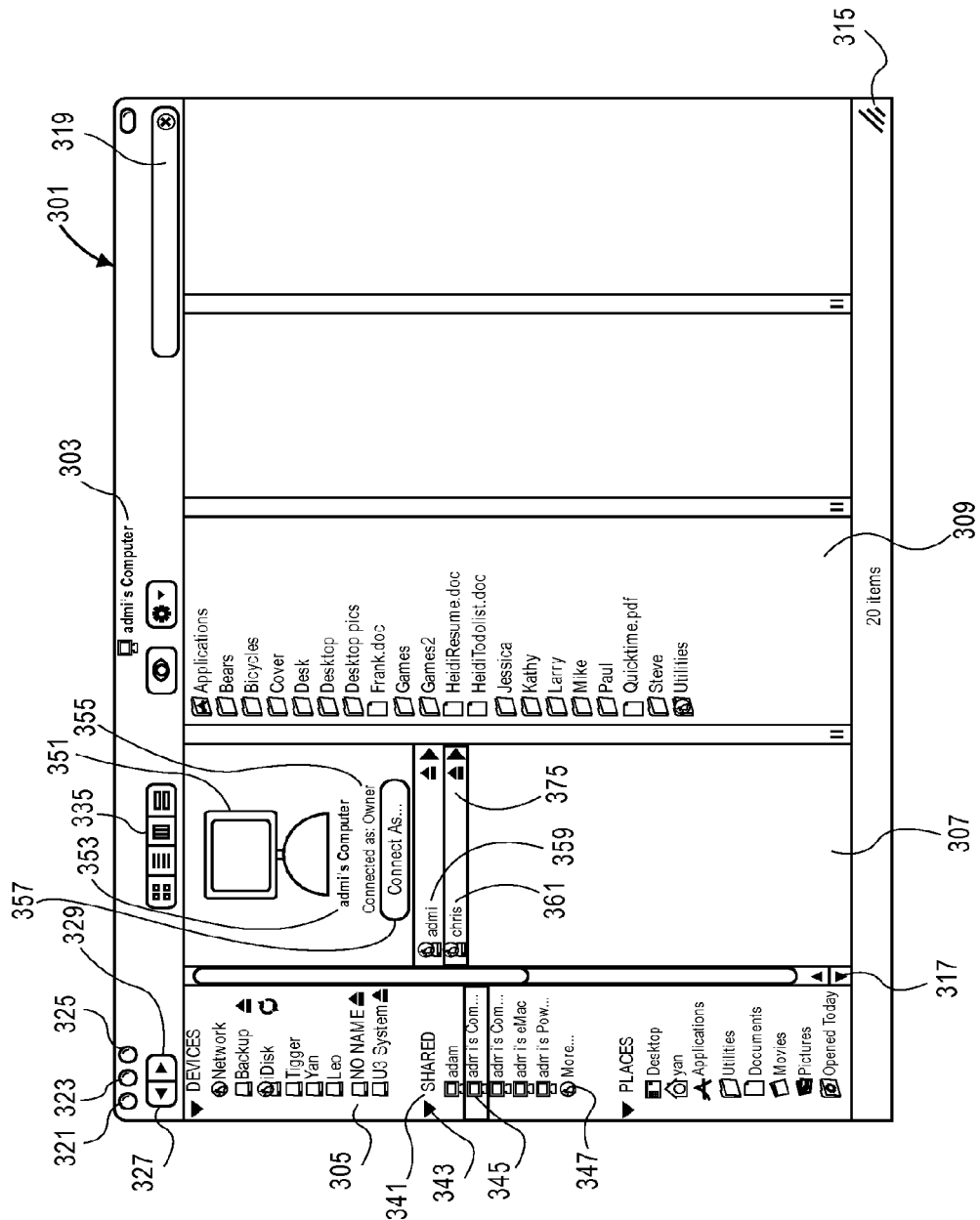
FIG. 3F shows an example of a user interface for a file management software window such as that shown in FIG. 3E with another storage volume having been selected.
Figure 3G:
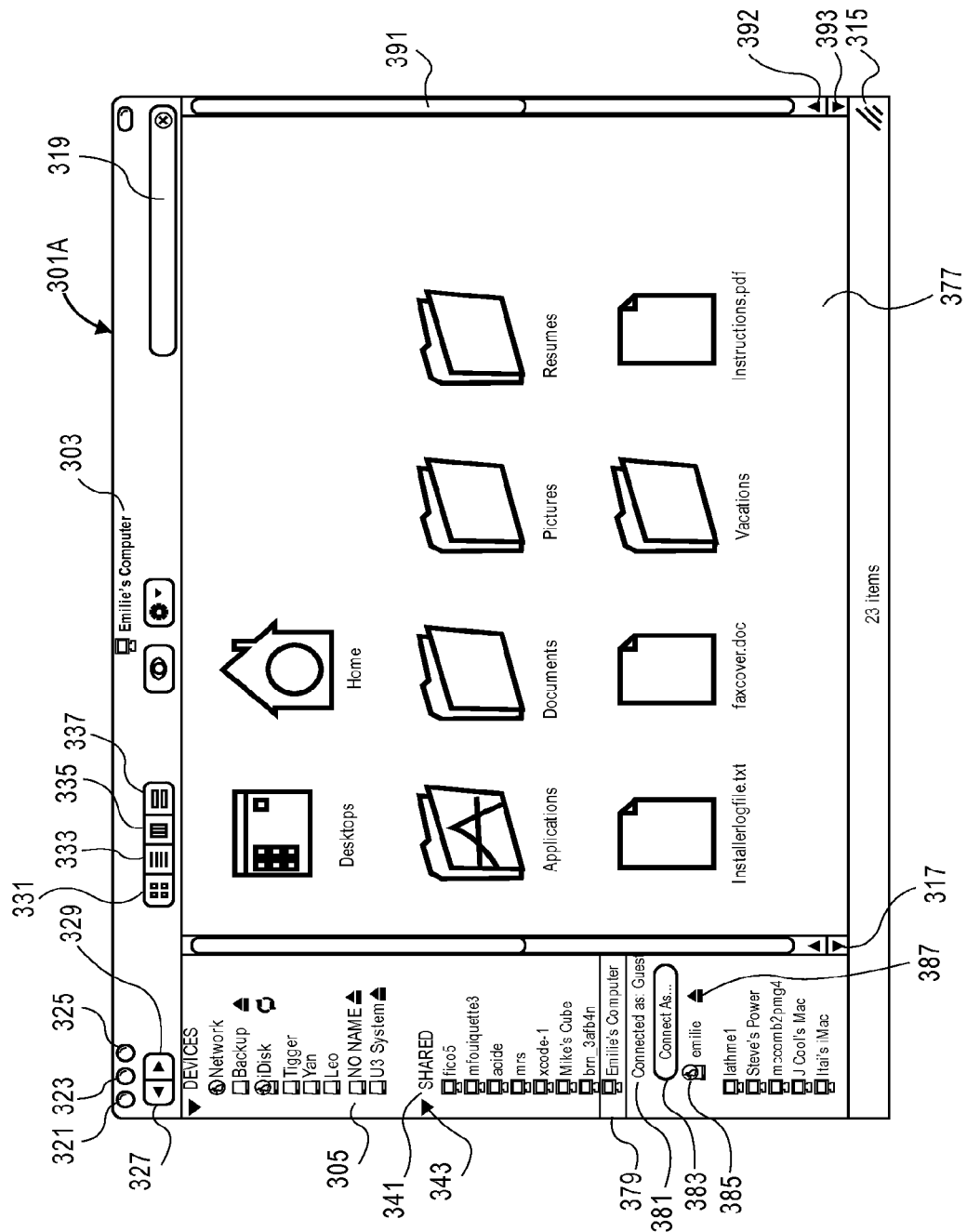
FIG. 3G is an example of a user interface, in an alternative embodiment, for a file management software window.
Figure 3H:
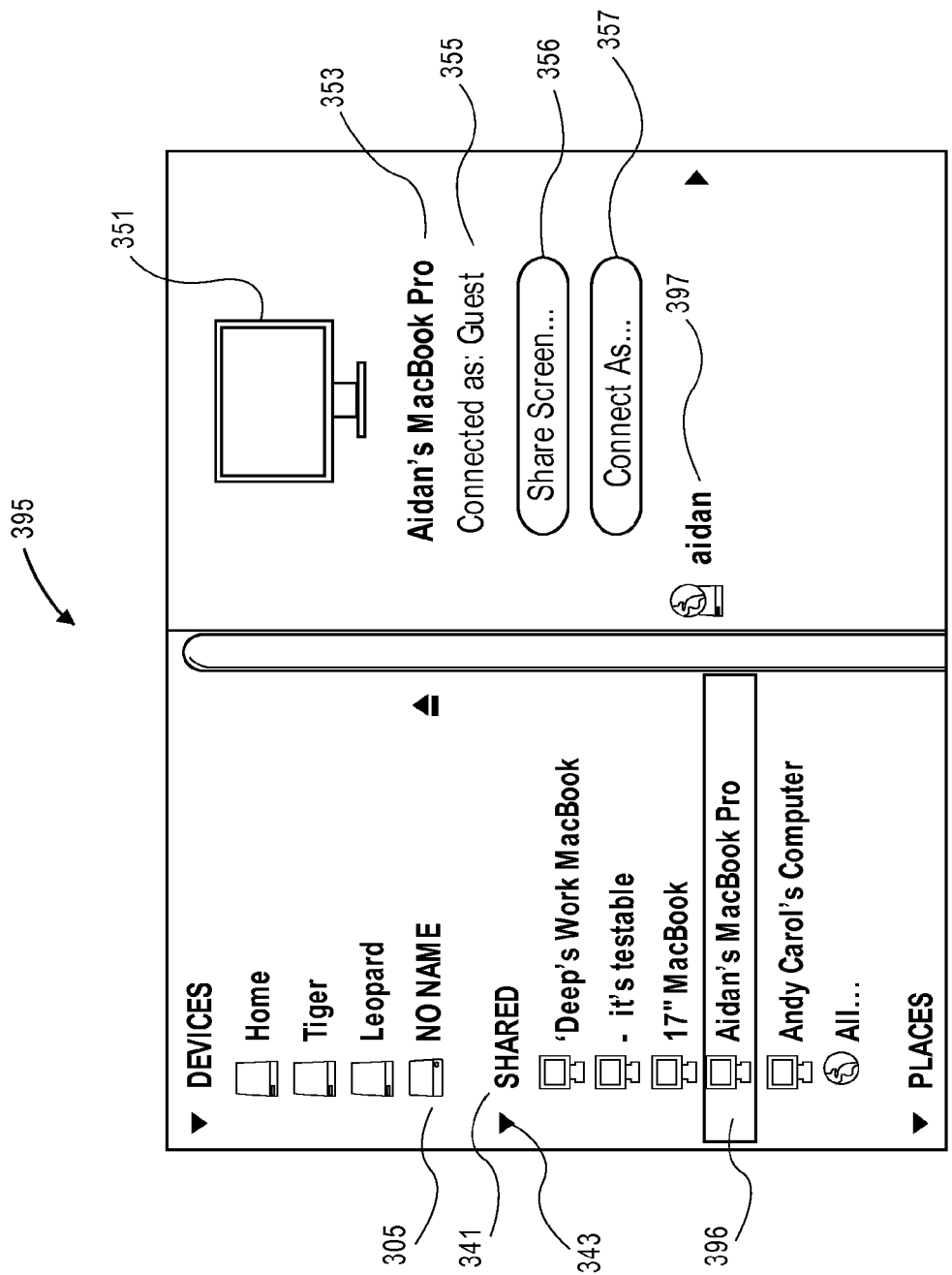
FIG. 3H shows a portion of a user interface for a file management software window according to another embodiment of the inventions described herein.
Figure 3I:
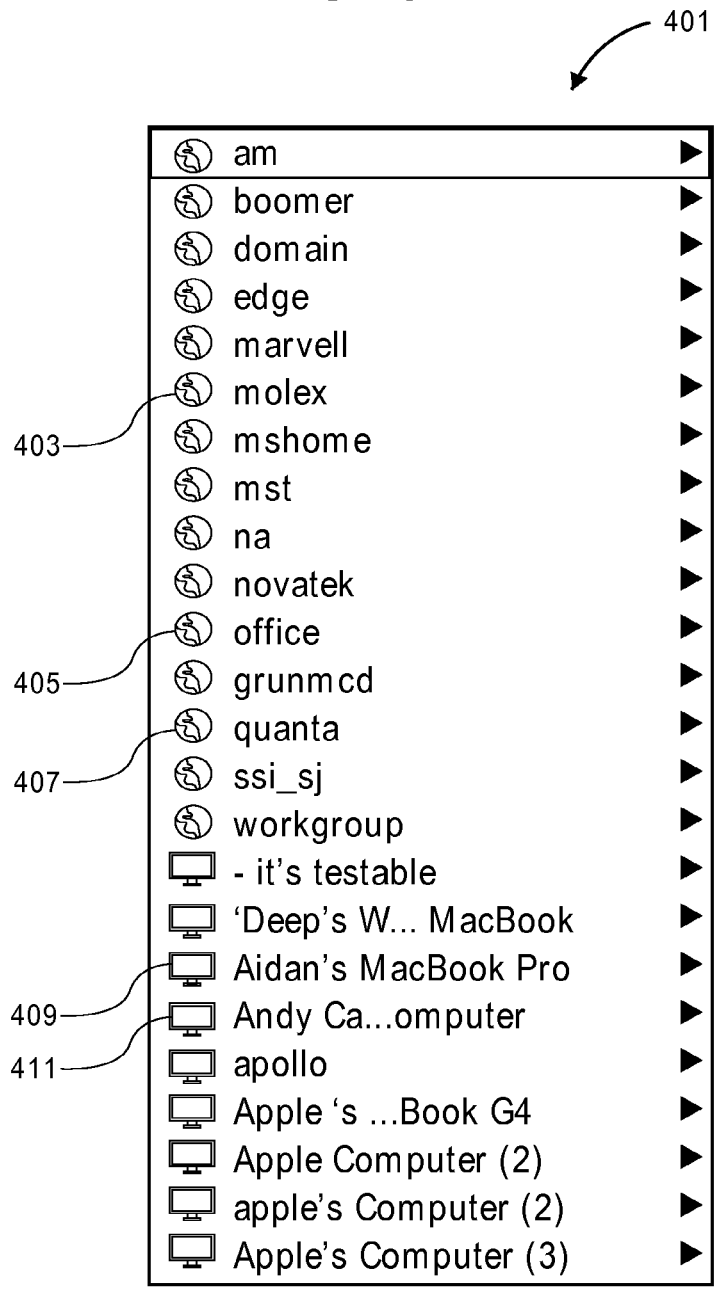
FIG. 3I shows a portion of the user interface of a user configurable portion of a file management software window in one embodiment of the inventions described herein.

A description of embodiments for providing file sharing services will now be provided by referring to FIG. 4 as well as FIGS. 3A-3J. At least certain of these methods provide for automatic logging into other data processing systems, at least at the guest user permission level, and this automatic logging in occurs without the user of the data processing system, which is receiving the sharing services, having to enter login data, such as a user name and/or a password. Further, these methods may automatically search for other systems on a network, such as a LAN, and automatically login, at least at guest level permission levels, to those other systems to allow the files on those systems to be shared, assuming that sharing has been enabled on those other systems. It will be understood that at least in certain embodiments, the other systems may disable the sharing by turning off file sharing or other sharing services. In operation 451 of FIG. 4, a command is received at a first data processing system to start or boot up the data processing system. In some embodiments, the command may alternatively be a command to exit a sleep mode or to log in a new user or to log in a user who has previously logged off. In response to the command, the first data processing system performs a startup procedure or a login procedure for the first data processing system. For example, the first data processing system may request a user of the first data processing system to enter an authorized user name, and optionally a password, to login to an established user account on the first data processing system. The first data processing system then proceeds to load various software programs, including a file management software program such as the Finder, to present the window 301 shown in FIG. 3A. In at least certain embodiments, the first data processing system may, in operation 453, retrieve user names and passwords (if needed) for a last set of other systems (other than the first data processing system) on one or more local area networks which were logged into during the last operating session for the current user of the first data processing system. It will be understood that operation 453 is optional in at least certain embodiments. In operation 455, the first data processing system automatically, during or after boot-up, logs into other systems (if available and if sharing is enabled for those other systems) from the last set if the last set is being used. This login operation to other data processing systems may be done without any user input from the user of the first data processing system. In other words, the first data processing system will automatically log into the other systems to obtain access to file sharing services (if enabled). In addition to the automatic login performed in operation 455 by the first data processing system, as it logs into other existing systems, the data processing system may also, in operation 457, automatically discover if any other devices, such as any other systems not in the last set, are active on the local area networks and the first data processing system may log into those systems as well, at least as a guest user (assuming sharing is enabled). Again, this login may be done without any user input by the user of the first data processing system. In operation 459, the first data processing system may then display, within the window of a file management software program, icons representing the systems already logged into. These icons may be displayed in the side bar region or user configurable portion of a file management software window. FIG. 3A shows an example of a side bar region or a user configurable portion 305 which displays a plurality of systems which have already been automatically logged into by the system using, for example, the method shown in FIG. 4. Further information with respect to a user configurable portion of a file management software window may be obtained in co-pending U.S. application Ser. No. 10/873,661, filed on Jun. 21, 2004, which application is incorporated herein by reference. In the example shown in FIG. 3A, the first data processing system has already logged into, without user input by the user of the first data processing system, five other systems, including the system represented by system icon 345. In this example, there may be many computers or other data processing systems on the network, and in this case the user interface has filtered those systems by presenting a reduced set, thereby showing only the five in the user configurable portion 305. More of the systems on the network may be displayed by selecting the "expand" user interface object 347 to display further systems on the network. In one embodiment, groups of systems, such as work groups or neighborhoods, may be displayed with an icon which is different than icons for individual data processing systems. FIG. 3I shows an example of a portion of a user configurable portion which includes one set of icons for work groups or neighborhoods and another set of icons for individual data processing systems. This type of user interface shown in FIG. 3I may be displayed in response to selecting the "expand" user interface object 347. Icons 403, 405, and 407 represent work groups having a plurality of systems, while icons 409 and 411 represent single data processing systems on a network. Icons 403, 405, or 407 may be selected to display a list of individual systems represented by the single icon, such as icon 403.

FIG. 3B shows the result of selecting the system icon 345, which causes the display of a shared system icon 351 in the column 307, along with the display of the shared system name 353 and the connection status user interface 355 and the "connect as" user interface button 357. In addition, in this example, icons of two storage volumes, icons 359 and 361, are displayed to represent the storage volumes which are available on the data processing system represented by icon 345. The user may, at the point shown in FIG. 3B, remain connected as a guest user and browse through the files and folders available to a guest user by selecting either icon 359 or 361. It will be appreciated that the user may double-click on one of those icons to open a new Finder window or other file management software window to display the contents of the selected storage volume.

In the example shown in FIG. 3C, it is assumed that the user has decided to log into the system represented by system icon 345 as a user with greater access permissions than a guest user. In particular, as shown in FIG. 3C, the user has positioned the cursor 365 over the "connect as" user interface button 357 and has selected that button to cause the display in the adjacent column 309 of a user name input field 367 and a password input field 369. In addition, a "connect" user interface button 371 is shown displayed within the column 309. If the user enters a proper user name and password for an existing account on the system represented by system icon 345 and then selects the "connect" user interface button 371, this will cause the first data processing system, which is running the file management software which is displaying the window 301, to log into the other data processing system represented by system icon 345 as, in the example shown in FIG. 3D, an owner, indicated by the connection status user interface 355 as shown in FIG. 3D. At this point the first data processing system may save the user name and password combination for this particular machine or data processing system as part of the last set of other systems used in operation 453, so that the next time the first data processing system is started or otherwise caused to perform automatic logins to other systems, the system represented by system icon 345 will be automatically logged into as an owner rather than as a guest.

In one embodiment, the first data processing system may mount automatically after a login one or more volumes of a system which provides a sharing service, such as the file sharing service provided by the system represented by icon 345. In alternative embodiments, the first data processing system may not automatically mount one or more such storage volumes but rather may wait for a user to select the particular storage volume for mounting. This embodiment is shown in operation 461 in which the first data processing system mounts a storage volume in response to a user's selection of an icon of a system already logged into. In the case shown in FIG. 3E, the user has selected icon 359 (which is a storage volume controlled by and "local" to the system represented by icon 345) which caused the first data processing system to mount the storage volume represented by icon 359, thereby causing the display of files and folders stored on that storage volume. These files and folders are shown in a simple list view in the column 309. In addition, in at least certain embodiments, an eject icon 375 may also be displayed adjacent to the icon of a volume. This eject icon may be selected by a user using known techniques in order to unmount the volume as is known in the art. FIG. 3F shows an example where the user or the system has selected the icon 361, which represents another storage volume coupled to the system represented by the system icon 345; in response to that selection, the first data processing system mounts the storage volume represented by icon 361 to display the files and folders which are accessible at the owner permission level and which are stored on that storage volume. Those files and folders are shown in the second column 309 shown in FIG. 3F.

FIG. 3G shows an alternative embodiment in which icons for the storage volumes as well as the connection status user interface and the "connect as" user interface button 357 are now shown in the user configurable portion 305 along with an icon representing the data processing system which is sharing its files or folders with the user of the first data processing system which is displaying the window 301A as shown in FIG. 3G. The file and folder viewing portion 377 within the window 301A is displaying the files and folders stored on a storage volume which is part of the data processing system ("Emilie's Computer") represented by the system icon 379 in the user configurable portion 305 of the window 301A. The connection status user interface 381 indicates that the first data processing system is connected to and sharing files from the second data processing system (Emilie's Computer) at the guest permission or guest user level. The user may change the permission level by selecting the "connect as" user interface button 383 now shown in the user configurable portion 305. A storage volume icon 385 is also shown along with an eject icon 387 in the user configurable portion 305. The storage volume icon 385 represents the storage volume of Emilie's computer, and that storage volume has been mounted at the guest permission level, showing the files and folders in the file and folder viewing portion 377 of FIG. 3G. The user may browse further into Emilie's computer by double-clicking on a folder, such as the Pictures folder or view the "Instructions.pdf" document by double-clicking on that document icon, etc. In this manner, the user may browse, at the guest user level, files and folders within the storage volume designated as Emilie and indicated by the storage volume icon 385. The user may unmount the system by selecting the "eject" icon 387.

FIG. 3H shows another example of a user embodiment which provides automatically sharing services including, in this case, a screen sharing service. In the example of FIG. 3H, the user configurable portion 305 has received a selection of the system icon 396 which has resulted in the display of a shared system icon 351 in an adjacent column. This particular system has one storage volume shown by storage volume icon 397. The embodiment shown in FIG. 3H further includes a "share screen" user interface button 356 which the user may select to activate screen sharing. In a typical embodiment, if the user activates screen sharing, then the screen of the second data processing system represented by shared system icon 351, will be displayed within a window or the entire screen of the system which presented the interface shown in FIG. 3H and which is receiving the screen sharing service.

The embodiments described above relative to FIGS. 3A-3I provide a method, in at least certain implementations, for automatically logging into, in response to starting a first data processing system, a second data processing system at least as a guest user of the second data processing system. Further, one or more user interface objects are displayed on a display device of the first data processing system, wherein the user interface objects represent systems or storage volumes of those systems which are providing a sharing service to the first data processing system in order to allow a search to be performed or browsing to be performed of the data stored on the storage volume which is being shared with the first data processing system. The logging in may occur automatically without requiring the user of the first data processing system to enter data comprising at least one of a user name and a password. This can occur even though the second data processing system which provides the sharing service has an operating system which includes a user login process; in this case, the user login process is performed automatically on the second data processing system which provides the sharing services so that a user of the first data processing system can search and browse files and folders stored on a storage volume of the second data processing system. In at least certain embodiments, the logging into of the second data processing system may occur even if the second data processing system is a new addition to the network to which the first data processing system is coupled. Further, the logging into may occur automatically even if it is the first time that the first data processing system is caused to log into the second data processing system, and this first time login may occur without any input from the user of the first data processing system.

Figure 3J:
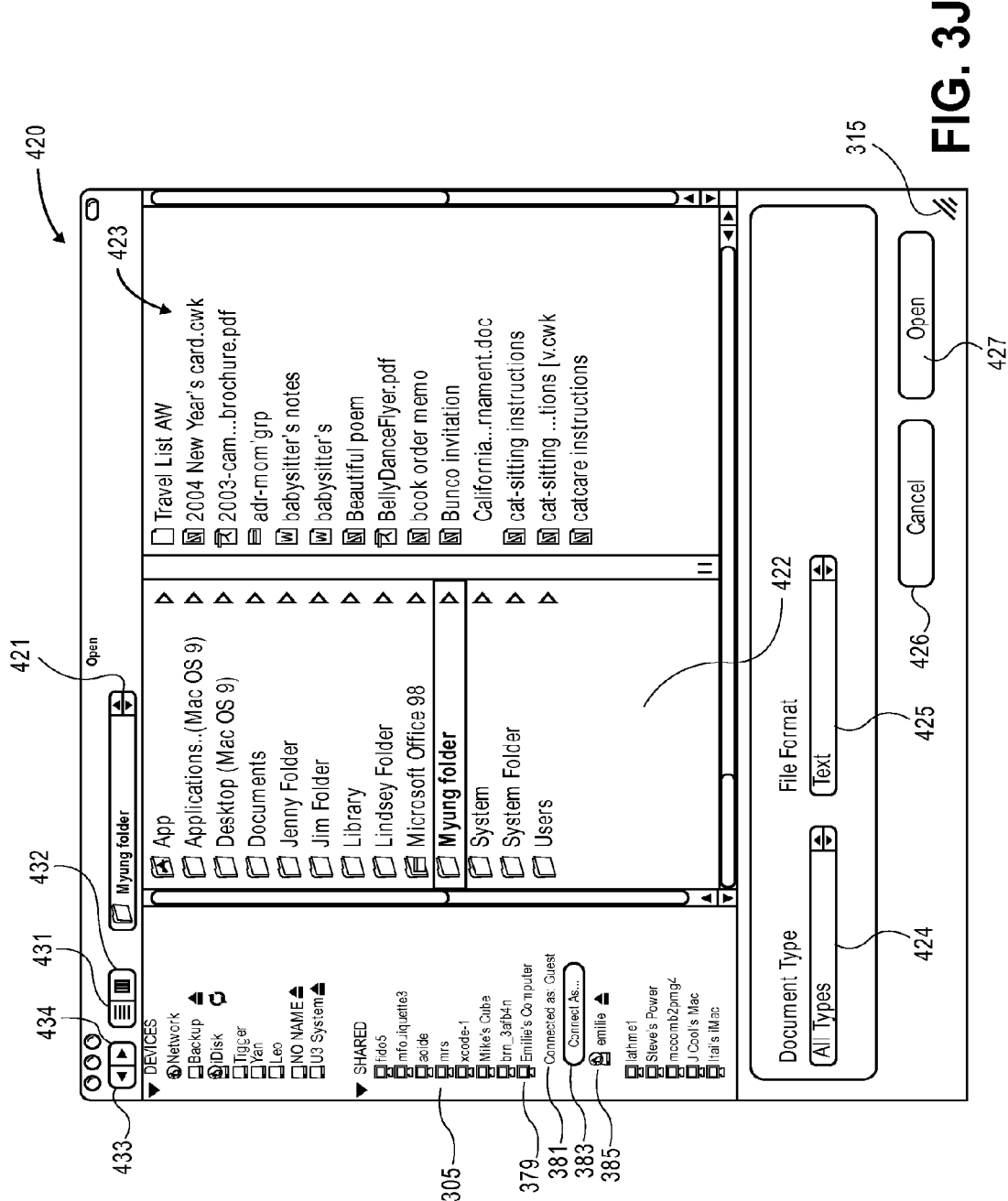
FIG. 3J shows another embodiment of the user interface of a window, which may be an open panel or open window or a save panel or a save window according to certain embodiments of the present inventions.

The methods described above may be extended to open and save and print dialog boxes or panels or windows within an application other than a file management software application, such as the Finder. For example, an open window for a word processing program or a save window or panel for an image processing program may include icons representing other systems which have been automatically logged into pursuant to one or more of the methods described herein. FIG. 3J shows an example of a user interface in which an open window 420 for a word processing program or other program other than a file management software program includes the user configurable portion 305 which includes other systems which have been logged into using one or more of the methods described herein. It can be seen that in the case of FIG. 3J, Emilie's computer has been logged into as a guest and the user may open a file from that computer on another computer system through the use of the open window 420 shown in FIG. 3J. The open window 420 includes an open button 427 which opens a selected file. The window further includes list views 422 and 423 within the main window section. The window 420 also includes a document type menu 424 which allows a user to select the type of document which is to be displayed in list 423 and opened, and a file format menu 425 which allows a user to select the format of a file to be displayed in list 423 and opened. The window 420 also includes a menu 421 which allows the user to select a different directory for opening a file or folder. The window 420 also includes a "back" user interface object 433 and a "forward" user interface object 434 as well as list and column view icons 431 and 432, respectively. It will be appreciated that a similar user interface may be provided in a save window or panel or dialog box or in a print window or dialog or panel, in each case being provided by a software program other than a file management software program.

Figure 5:
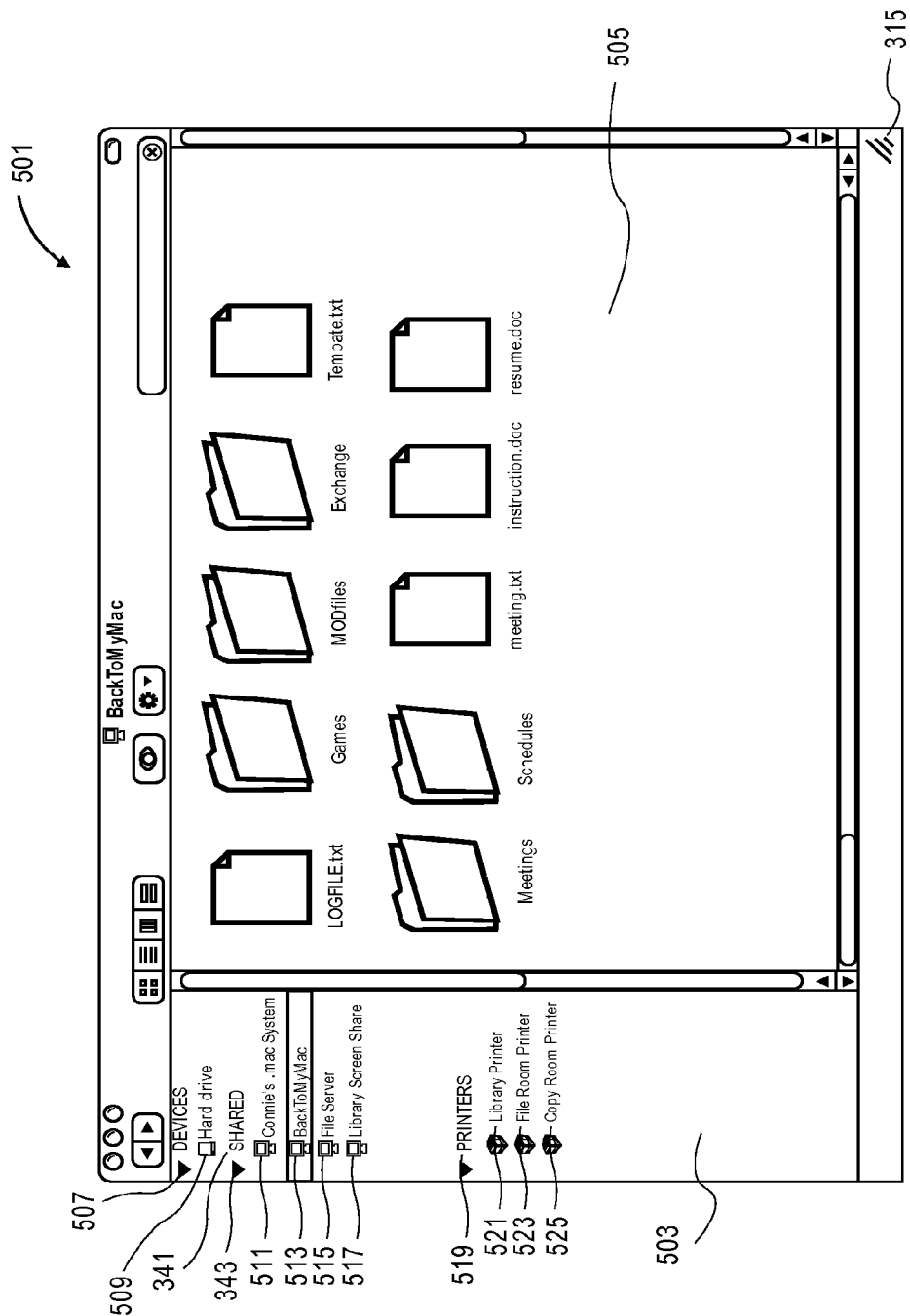
FIG. 5 shows an example of another embodiment of a user interface for a file management software window according to certain aspects of the present inventions.
Figure 6:
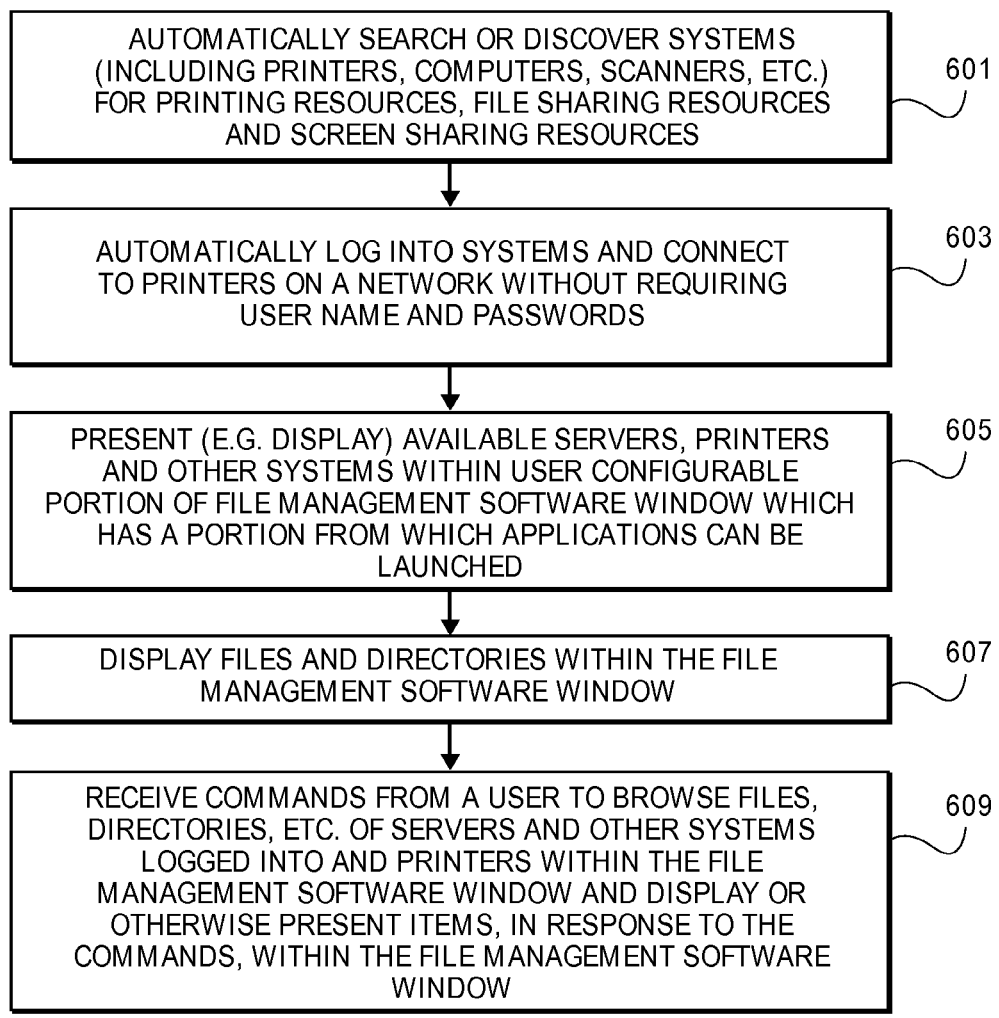
FIG. 6 is a flow chart which illustrates another method according to certain embodiments described herein.

FIGS. 5 and 6 will now be referred to while describing how, in at least certain embodiments, browsing through other systems which provide for file sharing, screen sharing, printer sharing, etc. can be made easier through a user interface which may automatically discover and/or search for such systems and log into those such systems. Further, after discovering and/or searching and logging into such systems, the user can browse through files, launch applications for those files, modify and save the files and perform other operations, limited only by the permissions level of the user for each other system through this improved user interface. The underlying architecture which provides this user interface may include one or more of the methods described herein, including methods described relative to FIGS. 4, 8, 9, and 11. For example, the system icon 513 represents a system which is providing file sharing to the system displaying the window 501 on a display device of that system. The system icon 513 may appear in the user configurable portion 503, which is scrollable and which is similar to the user configurable portion 305. The system icon 513 may appear as a result of the performance of a method such as that shown in FIG. 8 or FIG. 9. Further, the system icon 511 may appear in the user configurable portion 503 as a result of the performance of a method such as that shown in FIG. 11. Further, the system icon 515 may appear within the user configurable portion 503 in response to the performance of a method such as that shown in FIG. 4. Similarly, the screen sharing icon 517 may appear within the user configurable portion 503 in response to the execution of a method such as that shown in FIG. 4. In addition, the user configurable portion 503 includes a list of available networked printers displayed under the heading 519. In particular, three networked printers 521, 523, and 525 are shown as being available to the user using the data processing system which displays the window 501. Any one of these printers may be selected by the user or the system which in turn selects that printer as the default printer to print documents or otherwise selects that printer to print a particular document in a non-default mode. By providing a display of networked printers in a file management software window, such as the window 501 which displays files and folders for a selected directory within a file and folder viewing portion 505 of the window 501, the user is provided with an easier user interface to select one or more printers from within a file management software window, such as the window 501.

As shown in FIG. 5, the user or the system has selected the system icon 513 to allow the user to browse or search through files and folders on the storage volume associated with the system represented by the system icon 513. The user may change to a different remote system by selecting a different remote system under the shared heading 431. For example, the user may browse another system by selecting, for example, the system represented by the system icon 511 which in turn will cause the display of files and folders on that system within the file and folder viewing portion 505. From within the same window 501, the user may cause screen sharing to occur by selecting the screen sharing icon 517 within the user configurable portion 503.

FIG. 6 shows an example of a method which may be performed in conjunction with the user interface shown in FIG. 5. In operation 601, the system which displays the window 501, which is a file management software window provided by the file management software, such as the Finder or Windows Explorer, automatically searches or discovers other systems, including printers, computers, scanners, handheld computers, etc. for other resources, including sharing resources or printing resources or screen sharing resources, etc. The search or discovery may occur through an advertising process, known in the art, in which each system on a local network advertises its services through the network medium to other systems on the network. Hence the data processing system which generates and displays the window 501 may receive these advertisings of other services from other systems on the network and hence discover those systems automatically. In other embodiments, the data processing system which generates and displays the window 501 may send requests out to other systems on the network for a list of services, such as sharing services, from the other systems (and this list may be generated and sent by the other systems). The data processing system which generates and displays the window 501 may then perform operation 603 in which that data processing system automatically logs into the other systems which it discovered or searched for in operation 601 and connects to those other systems, which may include printers on a network, without requiring a user name and passwords for those other systems. Then in operation 605, the data processing system which displays the window 501 may display available servers, printers, and other systems within, for example, a user configurable portion of a file management software window, such as the window 501 shown in FIG. 5. A portion of the file management software window includes the display of files and folders found within the particular directory which is being browsed through or which appears as a result of a search; that portion may be the file and folder viewing portion 505 as shown in FIG. 5. Files within that portion, such as the "Instruction.doc" file shown in portion 505, may be selected by the user, causing an application to be launched, such as a word processing application, in order to display the contents of the file "Instruction.doc." The result in one embodiment of operation 607 is shown in FIG. 5, which includes various user interface objects to allow a user to provide commands which are received by the system in order to browse the files, directories, etc. of servers and other systems logged into and to browse or select or examine properties of printers within the same file management software window. This browsing may include selecting a file and opening it (e.g. by double-clicking on it) or selecting a directory represented in the user configurable portion 503, or using other techniques known in the art to browse files and folders from within one or more windows of a file management software program, such as the Finder or Windows Explorer.

Figure 7:
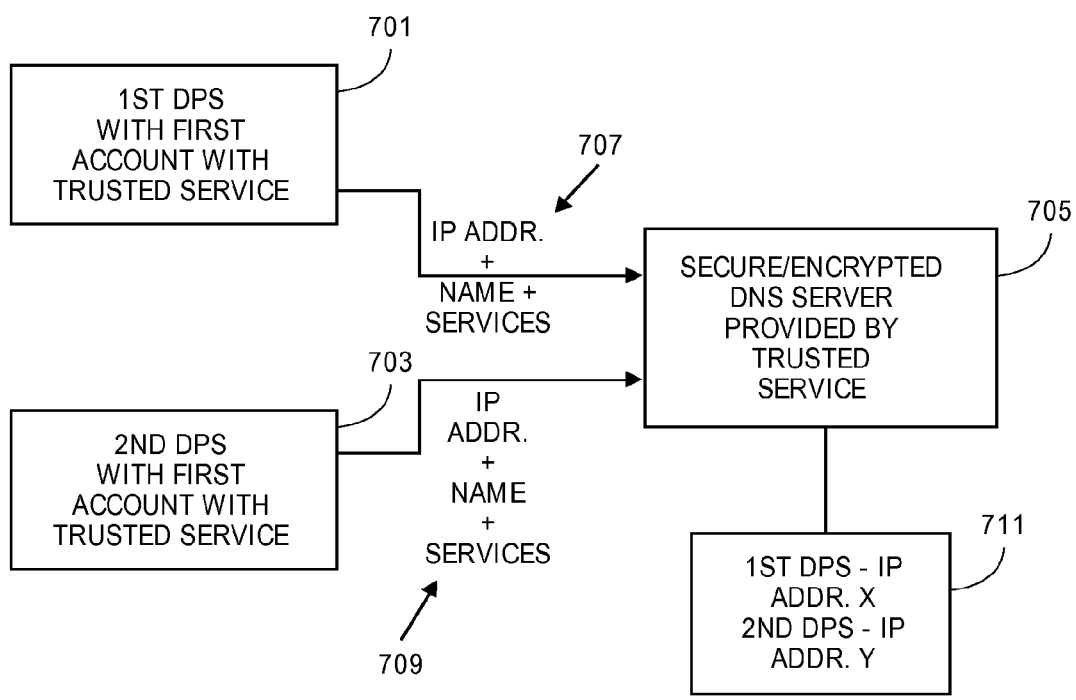
FIG. 7 shows an example of a system architecture for providing one embodiment of the inventions described herein.
Figure 8:
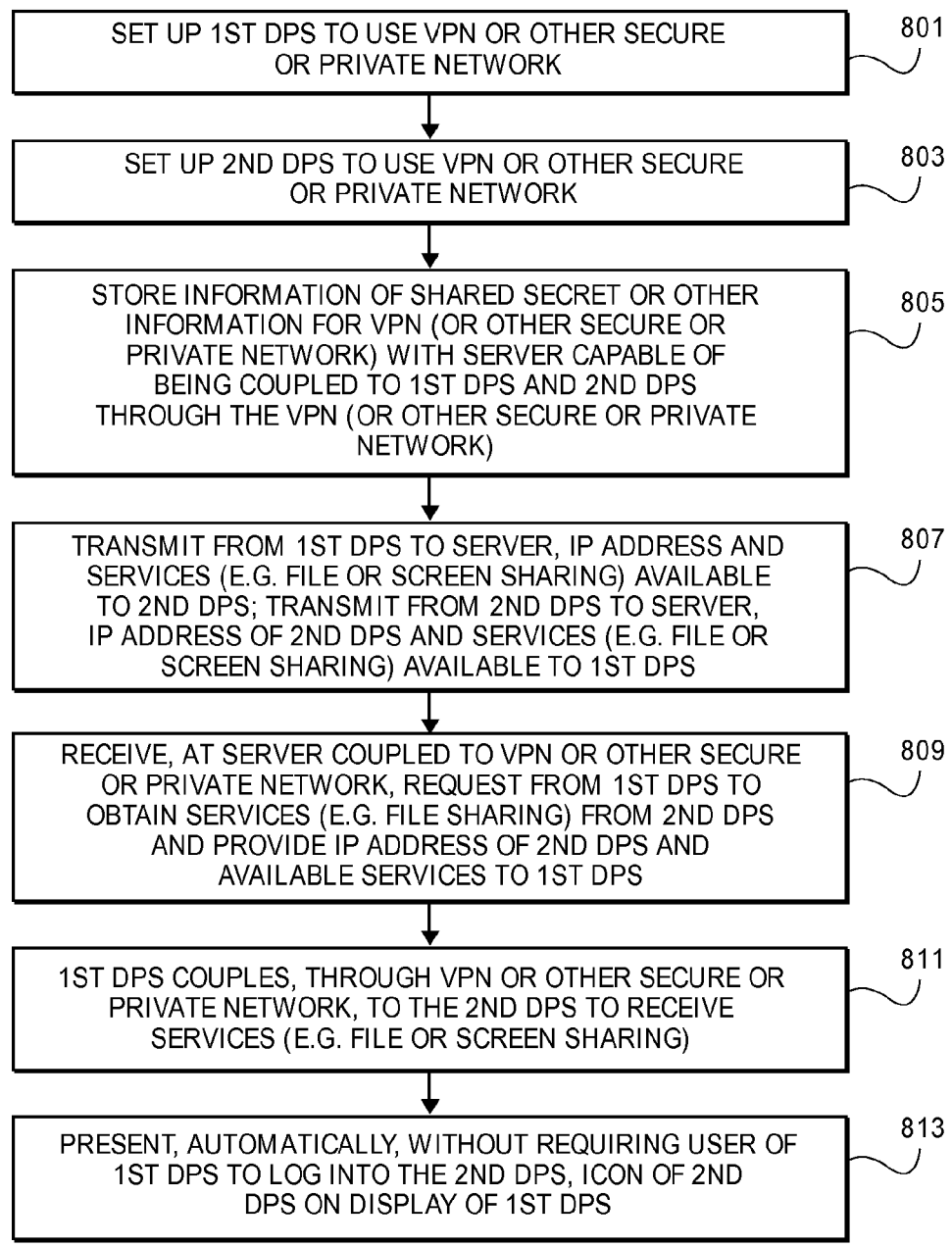
FIG. 8 is a flow chart which shows an example of a method according to certain embodiments which may operate with the system architecture shown in FIG. 7.
Figure 9:
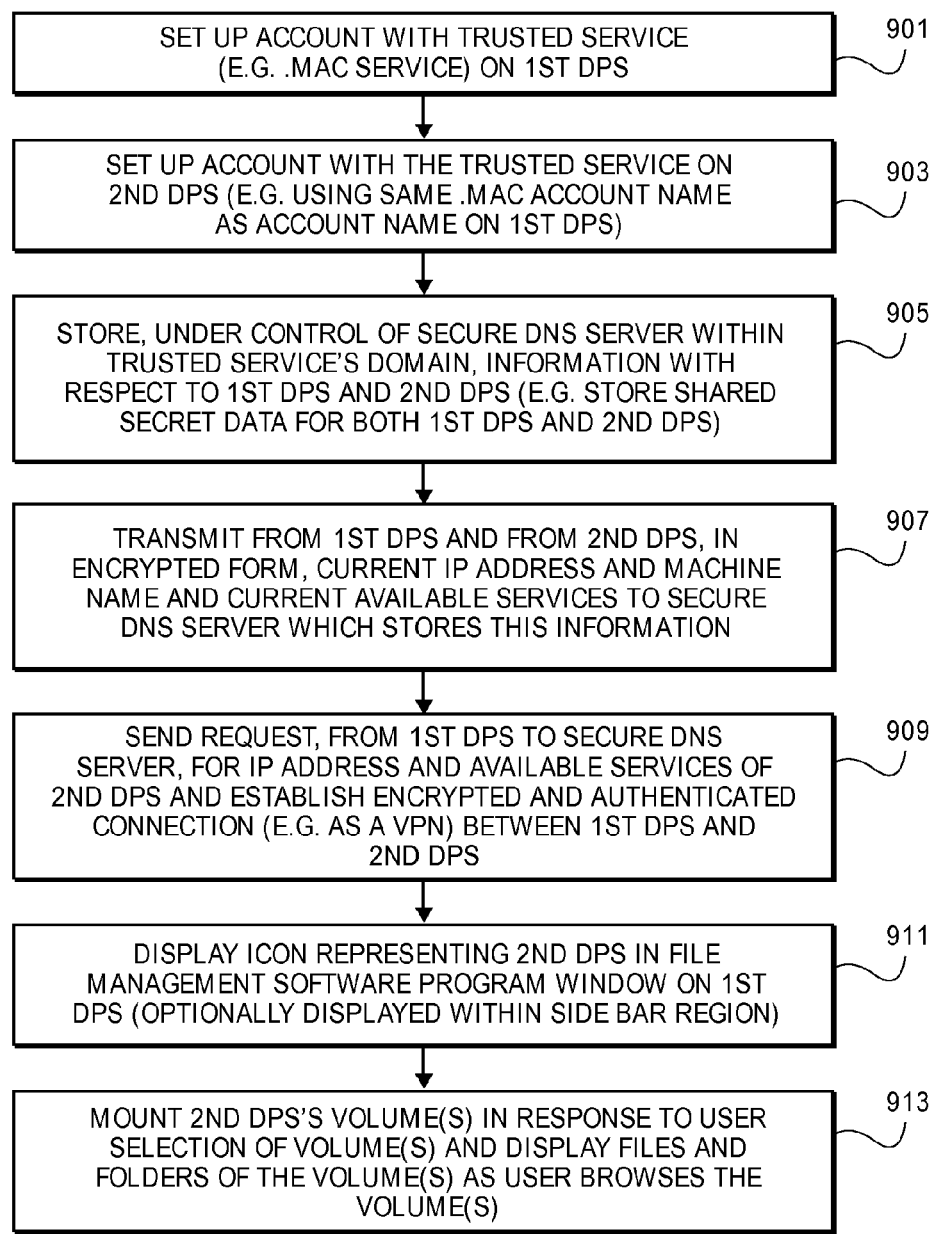
FIG. 9 shows another method according to certain embodiments which may operate with the system architecture shown in FIG. 7.

FIGS. 7, 8 and 9 relate to another aspect of the present inventions. This aspect provides an interface for accessing servers and other systems running on devices on a private network. In one example, a user can access at work servers running on his/her machine at home. In one implementation, this may be achieved by having the same ".mac" account on both systems which uses wide area Bonjour to advertise over a secure private network the presence of other systems on that private network. In an embodiment, one can browse from any data processing system set up with the same ".mac" account the servers on the other systems which are similarly set up with that ".mac" account.

FIG. 7 shows a system architecture which provides this capability. This capability may be performed automatically without any user input as long as the user has set both data processing systems up with, in one embodiment, the same account. In alternative embodiments, the account may differ between the systems and the server takes into account that difference but links the different accounts for the purpose of the sharing services described herein.

The system architecture shown in FIG. 7 includes a first data processing system 701 which has been set up with a first account with a trusted service, such as a ".mac" service or a similar service such as those described relative to the domain 201 described in conjunction with FIG. 2. A second data processing system 703 has also been set up with the first account, which is the same account as the account on the first data processing system 701, with the trusted service. The trusted service may be services provided by ".mac" or "msn.com" or "yahoo.com" or "google.com," etc. The service may include providing storage space on a remote server, providing synchronization services between different systems, including synchronizing calendars, address books, data files, etc. as well as email services and potentially other services (e.g. backup services). It will be understood that additional data processing systems beyond the two systems 701 and 703 may also be set up in a similar manner, such as with the same first account with a trusted service. Each of the systems 701 and 703 may be coupled through a network, such as the Internet, to provide information, such as an IP address and the name of the machine or system and the sharing services or other services provided (e.g. enabled) by that machine. This information is transmitted through the network to the service which includes a secure/encrypted DNS server provided by the trusted service. This server 705 includes a database 711 which associates the name of a data processing system with the IP address provided by the data processing system through the communications 707 and 709. In particular, the first data processing system 701 provides in a communication its current IP address, which may change (e.g. as a result of running the dynamic host configuration protocol) as well as the name of the first data processing system and the current services provided by that system, such as whether or not file sharing is enabled, screen sharing is enabled, and other sharing services. The communication 709 from the data processing system 703 similarly provides the current IP address of the data processing system 703 as well as the name of the second data processing system and the currently enabled services of the data processing system 703. Both of these communications 707 and 709 are received by the DNS server 705 which in turn stores this information in a database, such as the database 711.

FIG. 8 illustrates an example of a method which may be performed with the system architecture shown in FIG. 7. In operation 801, a first data processing system is set up to use a virtual private network or other secure or private network. In operation 803, a second data processing system is set up to use the virtual private network or other secure or private network, which is the same as the network set up in operation 801. In operation 805, a server may store information of a shared secret or other information for the virtual private network or other secure or private network. The server is capable of being coupled to the first data processing system and the second data processing system, such as the systems 701 and 703 shown in FIG. 7. The connection may be though a virtual private network or other secure or private network, which may include the Internet. In operation 807, the first data processing system may advertise its current IP address and currently enabled services, such as file or screen sharing, which are to be made available to another system, such as the second data processing system 703. Similarly, the second data processing system may transmit to the server its current IP address, which may change, as well as the enabled services which are to be made available to other data processing systems, such as the first data processing system. The server in operation 809 receives through a VPN or other secure or private network a request from the first data processing system to obtain services, such as file sharing, from the second data processing system, and in response, the server provides the current IP address of the second data processing system and the available services to the first data processing system. In response, in operation 811, the first data processing system couples, through the virtual private network or other secure or private network, to the second data processing system to receive those services which are available from the second data processing system. For example, the second data processing system may make file sharing available to the first data processing system such that a user of the first data processing system can browse and search through the data stored on the second data processing system. The first data processing system may, in operation 813, present, automatically, without requiring the user of the first data processing system to manually log into the second data processing system (e.g. without requiring the user of the first data processing system to enter login data, such as a user name), the icon of the second data processing system on a display of the first data processing system. The user may then select that icon to browse into the files of the second data processing system or to search through those files, such as a search of the metadata databases of that second data processing system or search a full text content indexed database on that system. It will be understood that in at least certain embodiments, the icon of the second data processing system may be displayed within a user configurable portion of a file management software window such as those shown in the examples of FIGS. 3A-3G.

In one embodiment, the first data processing system 701 may be the data processing system 213 which is within a home of the user having the first account, and the second data processing system may be a work computer, such as a data processing system 219 within a company or organization. In that case, the user of the system 213 and the system 219 have set up an account with a trusted service which includes a trusted server 203 which may include the secure/encrypted DNS server 705 of FIG. 7.

It will be appreciated that in at least certain embodiments, the communication 707 and 709 may be encrypted and may be provided to the DNS server 705 only after authenticating the identity of the DNS server 705. It will also be appreciated that the data processing system which requests a sharing service of another data processing system may provide a long-lived request to the DNS server to find the IP address and other information of that other system over time in case the IP address of that other system changes over time (e.g. as a result of a dynamic host configuration protocol).

FIG. 9 shows another example of a method which may use the system architecture shown in FIG. 7 to provide for automatic sharing services between two systems that have been set up with a trusted service which facilitates the sharing services dynamically as dynamic IP addresses change, etc. The method of FIG. 9 may automatically provide for sharing after both systems have been set up with the proper account with the trusted service. In other words, after both systems have been set up, starting up either system may cause it to automatically log into the other system through the server to obtain sharing services from the other system, without the user having been required to enter a user name or password to obtain sharing services for the other system. In other words, as long as the other system is powered up and is functional and has provided information to the service and sharing has been enabled, then turning on the other system automatically results in the retrieval of the IP address of the other system so that the system that has been turned on can obtain the sharing services automatically without user input and present a user interface showing that the particular sharing service has already been obtained, again without requiring a user input to do so. It will be appreciated that in at least certain embodiments, rather than asking for a user name or password, the system may prompt the user with a dialog box or other user interface which asks the user whether the user desires to use the sharing service. In that case, it will be appreciated that the login process is still automatic and may occur but can, in effect, be vetoed or canceled by selecting the "cancel" option in such a user interface.

The method of FIG. 9 may begin in operation 901 in which an account with a trusted service, such as a ".mac" service, is set up on the first data processing system. In operation 903, an account with the trusted service is also set up on the second data processing system. This may be the same account as the account set up on the first data processing system. In operation 905, information with respect to the first data processing system and the second data processing system is stored under the control of a secured DNS server within the trusted service's domain, such as within the domain "apple.com" or "mac.com." This information may be a shared secret which is shared among the secure DNS server and the first data processing system and the second data processing system. In one embodiment, the shared secret may be a ".mac" account name and the password for that ".mac" account name. In operation 907, the current IP address and machine name and currently available services (e.g. enabled services, such as file sharing, etc.) are transmitted from the first and from the second data processing system encrypted form to the secure DNS server which stores this information. In operation 909, a request is sent from the first data processing system to a secure DNS server for the IP address and available services of the second data processing system so that files and other data stored on the second data processing system may be accessed through the first data processing system. This request may result from starting up or booting up or logging into the first data processing system, and may occur automatically in response to starting up or logging into the first data processing system. As noted above, the request may be sent automatically or may be considered to be sent automatically even if a cancel option is presented to the user as described above. In response to the request, the first data processing system receives the current IP address for the second data processing system and establishes an encrypted and authenticated, in one embodiment, connection between the first data processing system and the second data processing system. In other embodiments, the connection between the first and second data processing systems may not be encrypted but may be authenticated. In operation 911, the first data processing system may display an icon representing the second data processing system in a file management software program, such as the Finder, in a window of the Finder.

Optionally, this icon may be displayed within a user configurable portion of a Finder window and this displaying operation may occur automatically in response to booting up or otherwise logging into the first data processing system without requiring the user of the first data processing system to enter a user name or password for the second data processing system. The process may still be considered automatic even if the first data processing system presents a user interface, such as a dialog, which asks the user whether the user wishes to cancel file sharing with the second data processing system. In operation 913, the first data processing system mounts one or more volumes of the second data processing system in response to either starting up or logging in of the first data processing system or in response to a user selection through a user interface object of one or more of the volumes of the second data processing system, wherein those user interface objects correspond to those volumes. In response, a Finder window or other file management software window may display the files and folders of the volume selected as the user browses or searches through those volumes. It will be appreciated that full text searches may be performed by entering text into the search input fields, such as the search input field 319, which may perform a Spotlight search (e.g. a search through metadata databases and full text indexed content databases maintained by the second data processing system).

Figure 10:
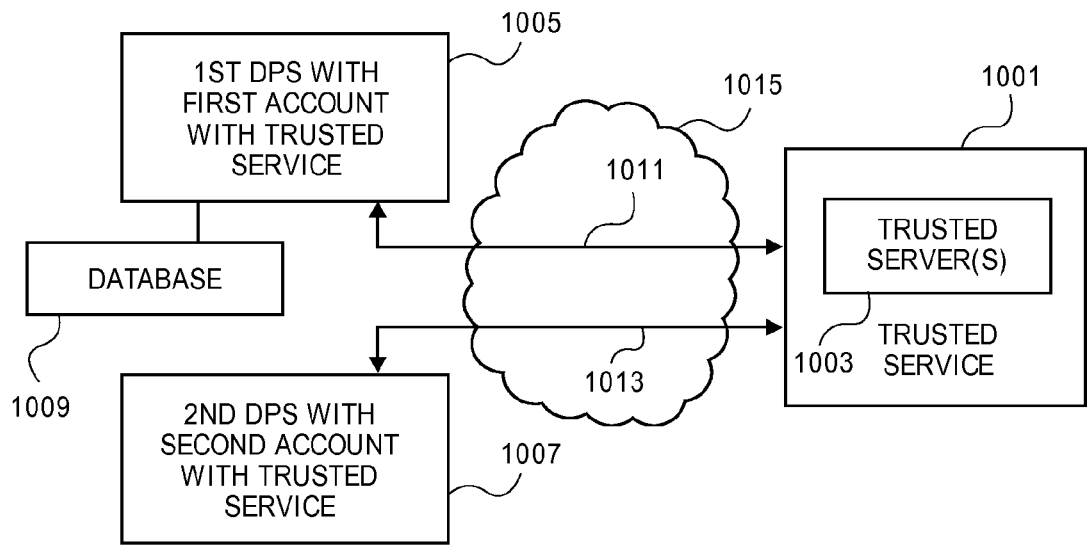
FIG. 10 shows an example of a system architecture according to certain embodiments of the present inventions.

FIGS. 10 and 11 relate to another aspect of the present inventions. This aspect relates to the automatic generation of an identity of a user of another system to allow the user of the another system to get access to the files on the system which automatically generates the identity for the user of the another system. This identity may be in the form of a certificate downloaded from a trusted source, such as a trusted service which operates a trusted server. In one embodiment, the certificates may be certificates of .mac users which are downloaded from a trusted server within the .mac domain. This is advantageous because user names and passwords need not be used by the user on the another system who seeks access to files on the system which automatically generated the identity. The authentication provided by the certificate may be used for file sharing or screen sharing or other forms of sharing. In one embodiment, the certificate obtained from the trusted service is used as a login identifier for the user on the another system which is seeking access to the system which created the service, such as a sharing service. In one embodiment, a first data processing system is set up with a first account with a trusted service, such as the data processing system 1005 shown in FIG. 10, and a second data processing system 1007 is set up with a second account with the trusted service. The first data processing system may include a database 1009 which may be a contact or address database which includes email addresses and other information with respect to the user of the second data processing system 1007. For example, the database 1009 may be an address book or contact database which includes the email address of the user of the second data processing system, which email address is provided as a service by the trusted service 1001 shown in FIG. 10. The first data processing system 1005 and the second data processing system 1007 are coupled to provide communications 1011 and 1013 to the trusted service 1001. These communications 1011 and 1013 may be through a private network or through the Internet 1015. The communication 1011 may include a request for a certificate for the user of the second data processing system and may include the response which may be a certificate which is downloaded and stored at the first data processing system. The communication 1013 may include a communication which sets up the second account to create the certificate for the user of the second data processing system, which certificate is downloaded in response to the request in communication 1011.

The operation of the system shown in FIG. 10 will now be described while referring to FIG. 11. In operation 1101, a user input is received at the first data processing system to establish a service, such as a sharing service (e.g. file sharing or screen sharing) on the first data processing system for a user of the second data processing system. This user input may be the selection of a name in a list of names in an address book. An entry for a selected name may include an email address or account name for the user of the second data processing system, which account is an account with the trusted service, such as the trusted service 1001. In one embodiment, the trusted service may be a service provided by the domain "mac.com" or similar services from "google.com," "yahoo.com," "msn.com," etc. In operation 1103, it is determined at the first data processing system if the user of the second data processing system has an account with the trusted service. If not, then operation 1105 follows in which conventional authentication is required for the user of the second data processing system to access a service from the first data processing system; this typically requires the user of the second data processing system to enter a user name and a password to obtain access to a service, such as a sharing service, which has been established on the first data processing system for that user. On the other hand, if operation 1103 determines that the user of the second data processing system has an account with a trusted service, then operation 1107 follows in which the first data processing system requests the certificate or other authentication data from the trusted service for the second data processing system. The certificate may be, for example, an X509 certificate which is known in the art. In one embodiment, the operation 1103 may determine that the user of the second data processing system has an account with the trusted service by examining an entry for that user in an address book or other contact database for that user; the account may be specified by an email address, such as a .mac email address (e.g. joe@mac.com). In other words, the first data processing system can automatically determine from such an email address for that particular user that an account does exist with the trusted service and then use information from that account as a login identifier.

In response to the request from the certificate in operation 1107, the first data processing system receives, in a download, the certificate and stores the certificate for the second data processing system. This certificate may be the certificate created for the user of the second data processing system when that user signed up or set up the account with the trusted service. In operation 1111, the second data processing system connects to the first data processing system and transmits authentication data, such as the second data processing system's certificate, which may include the account name with the trusted service. The certificate can be used to authenticate the second data processing system to the first data processing system and, in effect, log into the first data processing system to obtain access to files and/or other services from the first data processing system. The first data processing system may challenge the certificate in operation 1113 which may include determining if the certificate received from the data processing system is valid by comparing that certificate received from the second data processing system to the stored certificate which was obtained in operation 1109. It will be appreciated that there are a variety of different challenges which are known in the art for certificates. Hence, alternative challenges, rather than a mere comparison, may also be used or alternatively used. In another alternative embodiment, the first data processing system may, rather than using the stored certificate, obtain a current certificate for the second data processing system from the trusted service 1001 by transmitting a request, as in operation 1107, for that certificate. If the certificate is established to be valid in operation 1113, then the second data processing system may be logged in automatically as a user for the services which were established for that user without requiring the second user to enter a name or a password. Hence, by establishing one or more accounts with a trusted service, and by using an automatic identity generation process, such as that shown in FIG. 11, the user of the second data processing system can seamlessly and automatically log into another data processing system, such as the first data processing system, without having to enter a user name (which might be forgotten) and a password (which might be forgotten also).

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:
1. A method for automatically logging a client device into one or more data processing systems, the method comprising:
   at the client device:
   passively receiving, through a network to which the client device is connected, an advertisement indicating an availability of the one or more data processing systems, wherein each data processing system of the one or more data processing systems is accessible through the network;
   identifying, based on the advertisement, that each data processing system of the one or more data processing systems enables client devices to be automatically logged in to the data processing system;
   determining, for each data processing system of the one or more data processing systems, whether login credentials are available for the data processing system;
   in response to determining that login credentials are available for the data processing system:
      automatically logging into the data processing system using the login credentials to permit the client device to access the data processing system with a user account level of permission that exceeds a guest account level of permission;
   in response to determining that login credentials are not available for the data processing system:
      automatically logging into the data processing system at least as a guest user of the data processing system to permit the client device to access the data processing system with the guest account level of permission;

displaying a user interface object that includes filtered references for each data processing system of the one or more data processing systems; and accessing at least a portion of a functionality provided by a data processing system in response to a selection of one of the filtered references for the data processing system.

2. The method of claim 1, wherein each data processing system of the one or more data processing systems is a network-accessible storage volume, a printer, a scanner, or a handheld device.

3. The method of claim 2, wherein, when at least one data processing system of the one or more data processing systems is a storage volume, the method further comprises:

automatically mounting the storage volume.

4. The method of claim 3, wherein the user interface object includes a file management software window that includes a file and folder viewing portion that enables data stored on the mounted storage volume to be accessed.

5. The method of claim 1, wherein the advertisement is received in response to one of booting up from a shutdown state and logging in a user who was logged off.

6. A non-transitory computer readable storage medium storing instructions that, when executed by a processor included in a computing device, cause the computing device to carry out steps that include:

passively receiving, through a network to which the computing device is connected, an advertisement indicating an availability of one or more data processing systems, wherein each data processing system of the one or more data processing systems is accessible through the network;

identifying, based on the advertisement, that each data processing system of the one or more data processing systems enables computing devices to be automatically logged in to the data processing system;

determining, for each data processing system of the one or more data processing systems, whether login credentials are available for the data processing system;

in response to determining that login credentials are available for the data processing system:

automatically logging into the data processing system using the login credentials to permit the computing device to access the data processing system with a user account level of permission that exceeds a guest account level of permission;

in response to determining that login credentials are not available for the data processing system:

automatically logging into the data processing system at least as a guest user of the data processing system to permit the computing device to access the data processing system with the guest account level of permission;

displaying a user interface object that includes filtered references for each data processing system of the one or more data processing systems; and accessing at least a portion of a functionality provided by a data processing system in response to a selection of one of the filtered references for the data processing system.

7. The non-transitory computer readable storage medium of claim 6, wherein each data processing system of the one or more data processing systems is a network-accessible storage volume, a printer, a scanner, or a handheld device.

8. The non-transitory computer readable storage medium of claim 7, wherein, when at least one data processing system of the one or more data processing systems is a storage volume, the steps further include:

automatically mounting the storage volume.

9. The non-transitory computer readable storage medium of claim 8, wherein the user interface object includes a file management software window that includes a file and folder viewing portion that enables data stored on the storage volume to be accessed.

10. The non-transitory computer readable storage medium of claim 6, wherein the advertisement is received in response to one of booting up from a shutdown state and logging in a user who was logged off.

11. A computing device, comprising:

a processor; and a memory storing instructions that, when executed by the processor, cause the computing device to carry out steps that include:

passively receiving, through a network to which the computing device is connected, an advertisement indicating an availability of one or more data processing systems, wherein each data processing system of the one or more data processing systems is accessible through the network;

identifying, based on the advertisement, that each data processing system of the one or more data processing systems enables computing devices to be automatically logged in to the data processing system;

determining, for each data processing system of the one or more data processing systems, whether login credentials are available for the data processing system;

in response to determining that login credentials are available for the data processing system:

automatically logging into the data processing system using the login credentials to permit the computing device to access the data processing system with a user account level of permission that exceeds a guest account level of permission;

in response to determining that login credentials are not available for the data processing system:

automatically logging into the data processing system at least as a guest user of the data processing system to permit the computing device to access the data processing system with the guest account level of permission;

displaying a user interface object that includes filtered references for each data processing system of the one or more data processing systems; and accessing at least a portion of a functionality provided by a data processing system in response to a selection of one of the filtered references for the data processing system.

12. The computing device of claim 11, wherein each data processing system of the one or more data processing systems is a network-accessible storage volume, a printer, a scanner, or a handheld device.

13. The computing device of claim 12, wherein, when at least one data processing system of the one or more data processing systems is a storage volume, the steps further include:

automatically mounting the storage volume.

14. The computing device of claim 13, wherein the user interface object includes a file management software window that includes a file and folder viewing portion that enables data stored on the storage volume to be accessed.

* * * * *